US010790712B1

(12) United States Patent
Radford et al.

(10) Patent No.: US 10,790,712 B1
(45) Date of Patent: Sep. 29, 2020

(54) VARIABLE-FLUX MEMORY MOTOR AND METHODS OF CONTROLLING A VARIABLE-FLUX MOTOR

(71) Applicant: Jacobi Motors LLC, Webster, TX (US)

(72) Inventors: Nicolaus Radford, Webster, TX (US); Mohammadreza Barzegaranbaboli, Webster, TX (US); Akhila Bachapalli, Webster, TX (US); Takashi Nakachi, Webster, TX (US); Chaitanya Ravipalli, Webster, TX (US); Brian Wightman, Webster, TX (US); Shriya Bhatnagar, Webster, TX (US)

(73) Assignee: Jacobi Motors LLC, Webster, TX (US)

( * ) Notice: Subject to any disclaimer, the term of this patent is extended or adjusted under 35 U.S.C. 154(b) by 0 days.

(21) Appl. No.: 16/383,274

(22) Filed: Apr. 12, 2019

(51) Int. Cl.
| | |
|---|---|
| *H02P 1/46* | (2006.01) |
| *H02K 1/02* | (2006.01) |
| *H02K 1/24* | (2006.01) |
| *H02K 1/28* | (2006.01) |
| *H02K 11/225* | (2016.01) |
| *H02K 19/10* | (2006.01) |
| *H02P 21/18* | (2016.01) |
| *H02P 21/20* | (2016.01) |
| *H02P 21/22* | (2016.01) |
| *H01F 1/147* | (2006.01) |
| *H02P 25/089* | (2016.01) |

(52) U.S. Cl.
CPC ............... *H02K 1/02* (2013.01); *H01F 1/147* (2013.01); *H02K 1/246* (2013.01); *H02K 1/28* (2013.01); *H02K 11/225* (2016.01); *H02K 19/106* (2013.01); *H02P 21/18* (2016.02); *H02P 21/20* (2016.02); *H02P 21/22* (2016.02); *H02P 25/089* (2016.02); *H02P 2207/055* (2013.01)

(58) Field of Classification Search
CPC ...... H02K 1/02; H02K 1/2786; H02K 1/2773; H02P 1/42
See application file for complete search history.

(56) References Cited

U.S. PATENT DOCUMENTS

| | | | | |
|---|---|---|---|---|
| 3,412,257 | A | * | 11/1968 | Miller ...................... H02P 1/44 250/239 |
| 6,373,162 | B1 | | 4/2002 | Liang et al. |
| 6,591,925 | B2 | | 7/2003 | Raftari et al. |
| 6,800,977 | B1 | | 10/2004 | Ostovic |
| 8,860,356 | B2 | | 10/2014 | Yuuki et al. |
| 9,306,423 | B2 | | 4/2016 | Jang et al. |
| 10,063,180 | B2 | | 8/2018 | Wang et al. |
| 2016/0344242 | A1 | * | 11/2016 | Jang ........................ H02K 1/02 |
| 2017/0279392 | A1 | | 9/2017 | Fukushige et al. |

FOREIGN PATENT DOCUMENTS

WO      2014/003730 A1      1/2014

* cited by examiner

*Primary Examiner* — Karen Masih
(74) *Attorney, Agent, or Firm* — Osha Liang LLP

(57) ABSTRACT

In one aspect, embodiments of the invention are directed to a multi-pole rotor of a variable-flux memory motor (VFMM) that includes: a rotor core; and a plurality of poles. Each of the poles includes: one or more soft rotor magnets; a first ferrous wedge; and a second ferrous wedge. The one or more soft rotor magnets are disposed between the first and second ferrous wedges in a circumferential direction of the rotor.

24 Claims, 15 Drawing Sheets

VARIABLE-FLUX MEMORY MOTOR AND METHODS OF CONTROLLING A VARIABLE-FLUX MOTOR

BACKGROUND

Synchronous electric motors with permanent magnets such as variable-flux memory motors have a wide range of applications in industrial, commercial, and residential, applications, such as fans, pumps, compressors, elevators, and refrigerators, industrial machinery, and electric motor vehicles because of their high efficiencies. Also, because of using permanent magnets instead of windings in the rotors of the synchronous electric motors, there is no need for a rotor cooling. These advantages along with others (e.g., being brushless) make the synchronous electric motors popular where high torque, high efficiency, or low maintenance for electric motors is needed.

SUMMARY

In one aspect, embodiments of the invention are directed to a multi-pole rotor of a variable-flux memory motor (VFMM) that includes: a rotor core; and a plurality of poles. Each of the poles includes: one or more soft rotor magnets; a first ferrous wedge; and a second ferrous wedge. The one or more soft rotor magnets are disposed between the first and second ferrous wedges in a circumferential direction of the rotor.

In one aspect, embodiments of the invention are directed to a method of controlling a magnetization state of a VFMM. The method includes: receiving a command to change the magnetization state; determining an ideal magnetization state based on the command; measuring a back electromotive force generated by magnets of the rotor; determining a real-time magnetization state of the magnets based on the measured back electromotive force; determining a d-axis current pulse based on a difference between the ideal magnetization state and the real-time magnetization state; and sending the d-axis current pulse to stator windings of the VFMM to adjust the real-time magnetization state such that an absolute value of the difference between the ideal magnetization state and the adjusted real-time magnetization state falls within a predetermined threshold.

In one aspect, embodiments of the invention are directed to a method of automatically controlling a magnetization state of a VFMM. The method includes: measuring a speed of the VFMM; determine a torque of the VFMM; determining an ideal magnetization state based on the speed and the torque of the VFMM; measuring a back electromotive force generated by magnets of the rotor; determining a real-time magnetization state of the magnets based on the measured back electromotive force; determining a d-axis current pulse based on a difference between the set-magnetization state and the real-time magnetization state; and sending the d-axis current pulse to stator windings of the VFMM to adjust the real-time magnetization state to the set-magnetization state such that an absolute value of the difference between the ideal magnetization state and the adjusted real-time magnetization state falls within a predetermined threshold.

In one aspect, embodiments of the invention are directed to a system for VFMM. The system includes: a VFMM; and a controller. The VFMM includes: a rotor that includes a rotor core and a plurality of poles; and a stator. Each of the poles of the rotor includes: one or more soft rotor magnets; a first ferrous wedge; and a second ferrous wedge. The one or more soft rotor magnets are disposed between the first and second ferrous wedges. The stator includes: first, second, and third stator windings corresponding to first, second, and third magnetization phases, respectively; and at least one sense coil that measures a magnetization state of the VFMM. The controller controls the magnetization state of the VFMM based on the magnetization state of the VFMM measured via the sense coil. The controller adjusts the magnetization state of the VFMM via a current pulse in at least one of the first, second, and third stator windings.

Other aspects of the invention will be apparent from the following description and the appended claims.

DETAILED DESCRIPTION

Figure 1:
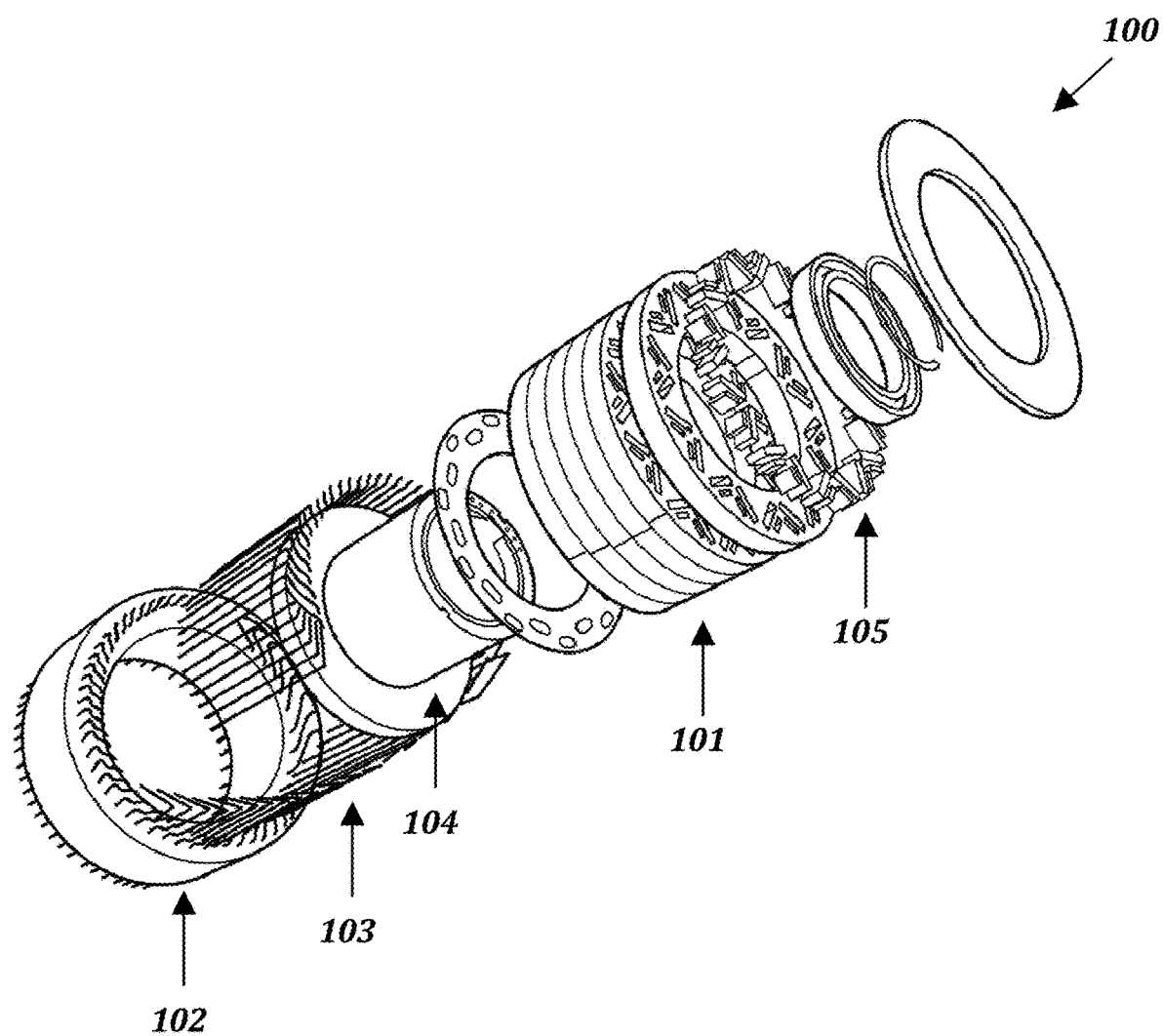
FIG. 1 shows a synchronous electric motor.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it would have been apparent to one of ordinary skill in the art that the invention may be practiced without these specific details. In other instances, well-known features have not been described in detail to avoid unnecessarily complicating the description.

FIG. 1 shows an exploded view of a synchronous electric motor (100) (hereinafter, will be referred to as "synchronous motor") including a rotor (101), a stator (102), and stator windings (103) arranged around a rotor hub (104). The synchronous motor may also include a terminal box for connecting input power, a cooling fan, a rotor position sensor, temperature sensors, liquid cooling housings, etc. The rotor (101) includes multiple poles, each including permanent magnets (105) (PM).

The synchronous motor (100) operates via a three-phase AC input, in which each phase is delayed from the other two phases by 120 degrees. To create the three-phase AC input, a power converter may convert DC power fed to the power converter from a high voltage DC source (e.g., a battery). By applying the three-phase AC input to the synchronous motor, the stator windings create a three-phase magnetic field that interacts with the magnetic fields of the PMs (105) and cause the rotor (101) to rotate with a fixed number of revolutions per minute (RPM) speed in a steady-state (hereinafter, will be referred to as "RPM"). The RPM of the synchronous motor is fixed to limiting factors such as number of poles, available voltage, and flux linkage ($\lambda_m$), which is provided and is fixed by the PMs. Synchronous motors have a wide range of applications in industrial, commercial, and residential, applications, such as fans, pumps, compressors, elevators, and refrigerators, industrial machinery, and electric vehicles.

In one or more embodiments, because the $\lambda_m$ provided by the PMs is fixed, the synchronous motors with PMs have a narrow constant power speed range (CPSR), which is the speed range at which the drive of the motor can maintain a constant power with limited values of input voltage and current of the motor. Thus, increasing the CPSR of the synchronous motors without using advanced control techniques such as implementing flux-weakening control methods is difficult. Because of the narrow range of CPSR for the synchronous motors, using a transmission system may be required to change a CPSR of a system driven by the synchronous motor. Even using such advanced methods extend the CPSR of the synchronous motors to 2 to 3. On the other hand, the CPSR of the VFMM according to one or more embodiments may achieve 4 to 6.

In general, embodiments of the invention relate to designs of VFMMs, rotors for VFMMs, and methods for magnetizing VFMMs. A VFMM is a type of synchronous motor in which magnetization of rotor magnets (RM) of the VFMM can be adjusted (i.e., changed) during an operation of the VFMM. The adjustment of the magnetization of the RMs (hereinafter, will be referred to as "VFMM magnetization" for simplicity) changes the RPM of the VFMM. According to one or more embodiments, to facilitate the change in the VFMM magnetization, the RMs are made of a soft-ferromagnetic material such as aluminum nickel cobalt (AlNiCo) or some types of ceramics. Hereinafter, the RMs made of a soft-ferromagnetic material will be referred to as "soft RMs." According to one or more embodiments, the soft RMs may be AlNiCo with grades 1-9 or magnets comprised of AlNiCo, cast, ceramics, some grades of samarium cobalt, or sintered construction of these materials. It is apparent that one of ordinary skill in the art could use specific amounts of these materials to achieve a desired function of the VFMM.

The VFMM in accordance with one or more embodiments is a better substitute to a synchronous motor because a maximum achievable RPM with a limited voltage of the VFMM may be more efficiently attained through changing the VFMM magnetization. In other words, the CPSR of the VFMM could have a wider range compared to the CPSR of the synchronous motor. Thus, there is no need to couple the transmission system to the VFMM. Consequently, according to one or more embodiments, using the VFMM potentially reduces manufacturing costs of electric motor-equipped systems due to being magnetized or demagnetized during assembly.

Soft-ferromagnetic materials have high permeability (same as hard-ferromagnetic materials such as alloys of iron and nickel) but low coercivity (unlike hard-ferromagnetic materials). Because of the low coercivity of soft-ferromagnetic materials, changing the magnetization of soft-ferromagnetic materials requires relatively smaller magnetic field compared to hard-ferromagnetic materials.

In one or more embodiments, only soft RMs may be used as the magnets of the rotor of the VFMM and there may be no hard magnets (i.e., magnets made of hard-ferromagnetic materials) mounted on the rotor. Alternatively, in one or more embodiments, both of the soft RMs and hard magnets may be used as the magnets of the rotor of the VFMM. Embodiments of the invention may have advantages over synchronous motors, which use only hard magnets, because hard magnets are made of rare-earth materials and are significantly more expensive than soft RMs (e.g., AlNiCo). Thus, partially or entirely using soft RMs instead of hard magnets in the VFMM significantly reduces manufacturing costs of the VFMM compared to traditional synchronous motors.

Additionally, another advantage of using the soft RMs is that control and change of the overall magnetization of the overall magnets of the VFMM can be done in a wide range. According to one or more embodiments, the overall magnetization of the soft RMs can be changed to any value from 0% magnetization (i.e., the soft RMs are completely demagnetized) to 100% magnetization (i.e., the soft RMs are magnetized to their maximum capacity). This change in magnetization may occur in a short time (e.g., about 1 millisecond).

In contrast, hard magnets do not tend to change their magnetization easily. Accordingly, changing the magnetization of hard magnets requires significantly more power than the operating power of a VFMM or other types of synchronous motors. For example, changing magnetization of hard magnets, such as some grades of neodymium iron boron (NdFeB) and samarium cobalt (SmCo) may require a power more than 10 folds higher that a power required for changing magnetization of the soft RMs. Thus, if the hard magnets are used in the VFMM, the magnetization of the hard magnets cannot be changed, unless a high current is applied to the stator windings. However, such a high current may damage the windings or other components of the electric motor.

According to one or more embodiments, if a current that is significantly higher than operational current of the stator windings passes the stator windings, this current may temporarily change the magnetization of the soft RMs to an unwanted value. This current (hereinafter, will be referred to as the "glitch current") may be generated due to an unwanted glitch in the VFMM or a controller that controls the VFMM. However, it will be easy to revive the magnetization of the soft RMs by another current that is bearable by the stator windings. No matter how high the glitch current be, the magnetization of the soft RMs can be revived via a relatively smaller current than the glitch current because soft RMs can easily accept a different magnetization (compared to hard magnets).

On the other hand, if a synchronous motor that has soft magnet (such as a VFMM) includes hard magnets and the glitch current changes the magnetization of the hard magnets, reviving the magnetization of the hard magnets via a current in the stator windings will be difficult. Such a current capable of reviving the hard magnets may be too high to bear for the stator windings or other parts of the synchronous motor. For example, such a high current may burn the stator windings or may dislocate various components of the synchronous motor such as the rotor and the windings. To revive the hard magnets, the synchronous motor must be opened and the hard magnets must be separated from the synchronous motor to be placed under a high magnetic field.

In one or more embodiments, a certain number or amount of hard magnets may be used to create a magnetization baseline for the VFMM. Because the magnetization of the hard magnets is reluctant to change, the magnetization of the hard magnets will be the magnetization baseline, and the magnetization of the soft magnets will change the overall magnetization from the magnetization baseline (to higher or lower magnetization from the baseline, depending on the torque and RPM of the VFMM).

Figure 2:
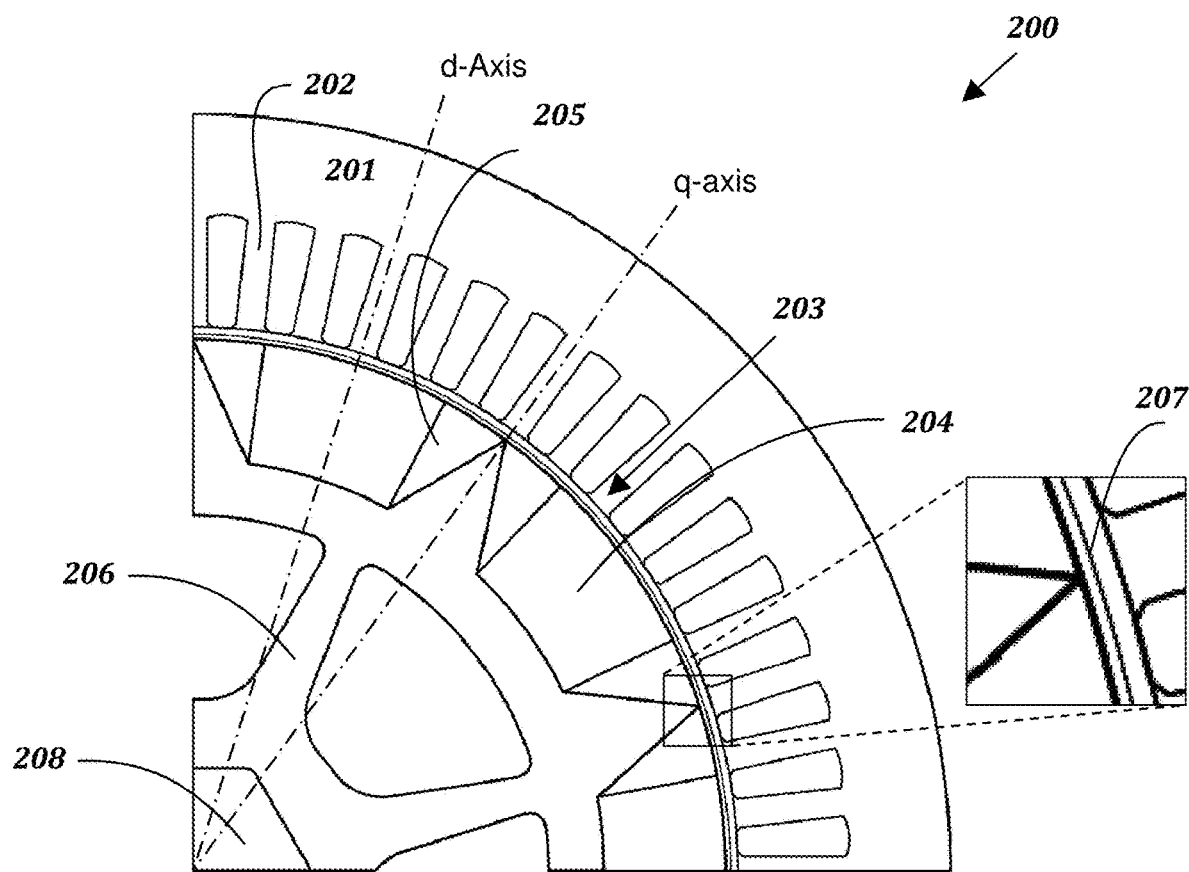
FIG. 2 shows a cross-sectional view of a variable-flux memory motor (VFMM) in accordance with one or more embodiments of the invention.

FIG. 2 shows a cross-sectional view of the VFMM (200) in accordance with one or more embodiments of the invention. The VFMM (200) of FIG. 2 includes a stator (201) that holds the stator windings in slots between adjacent stator teeth (202), and a rotor (203). The rotor (203) includes the soft RMs (204) and ferrous wedges (205) that are mounted on a rotor core (206). The rotor (203) is mounted on a shaft (208). The rotor (203) includes a sleeve (207) that keeps the soft RMs (204) and ferrous wedges (205) together. The sleeve (207) may be 0.5 to 3 millimeter (mm) thick in the radial direction. The thickness is determined by the centrifugal force exerted by the soft RMs (204) and the ferrous wedges (205). Alternatively, in one or more embodiments, the sleeve (207) may adhere to any one of the soft RMs (204), the ferrous wedges (205), and/or the rotor core (206).

In these embodiments, the sleeve (207) may be from a non-binding material, which does not adhere to the soft RMs (204), the ferrous wedges (205), and/or the rotor core (206). The non-binding sleeve (207) may be from carbon fiber HEX TOW IM10 or a Kevlar tow (i.e., Kevlar twine). Alternatively, the sleeve (207) may be a part of the rotor assembly.

The d-axis (direct axis) and q-axis (quadrature axis) are shown in FIG. 2. D-axis is the axis in which the magnetic field of the rotor is at its peak. For example, d-axis in FIG. 2 is between the soft RMs (204) of each of the poles where the magnetic field of the rotor (203) is the highest. Q-axis is away from the d-axis by 90 degrees phase. For example, q-axis in FIG. 2 is in the middle of the adjacent poles that is between the adjacent ferrous wedges (205) where the magnetic field of the rotor (203) is the lowest.

Figure 3A:
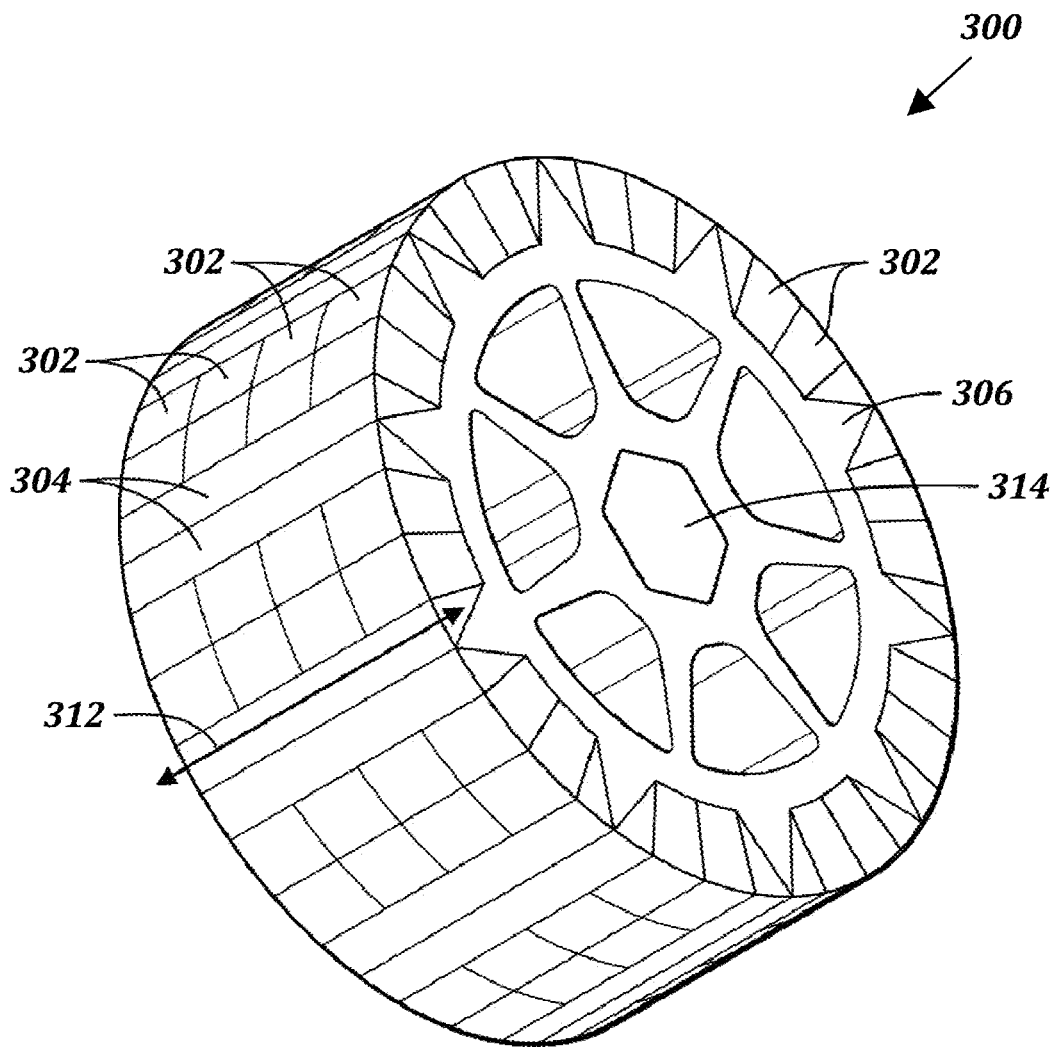
FIGS. 3A-3B show two views of a rotor of a VFMM in accordance with one or more embodiments of the invention.
Figure 3B:
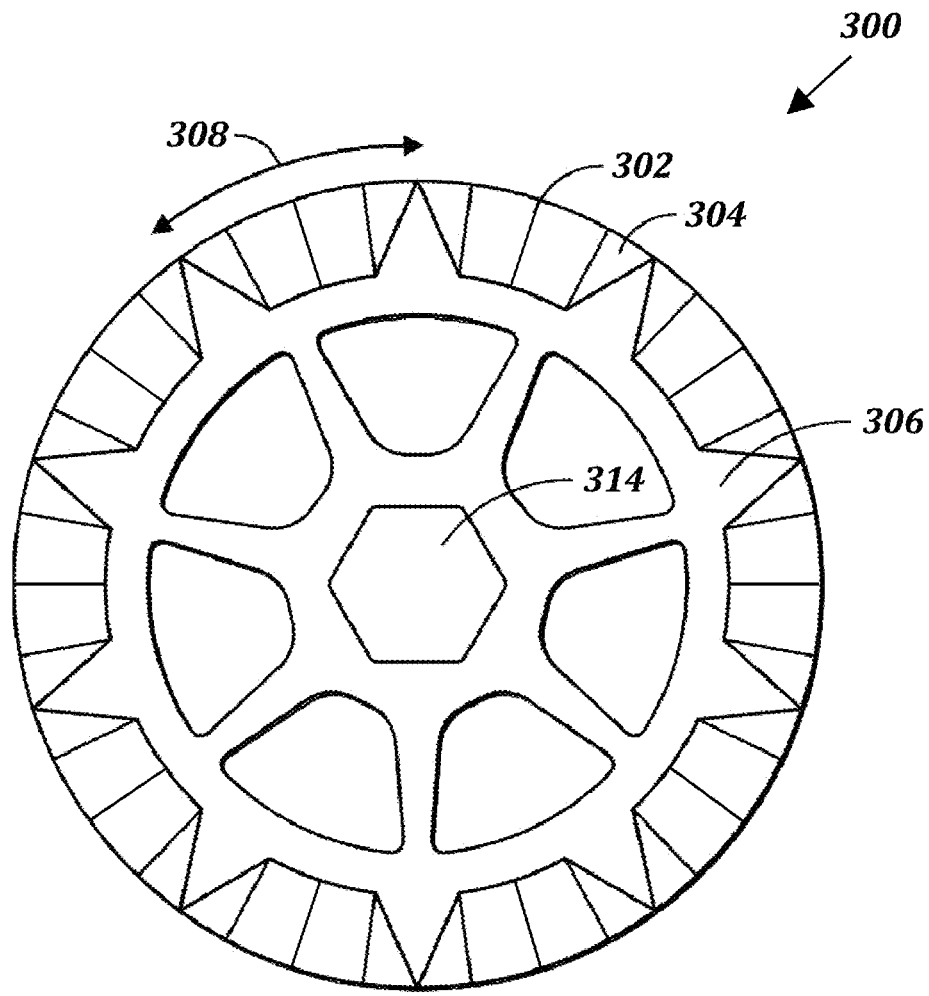

According to one or more embodiments, the rotor includes multiple poles and each of the poles includes one or more of the soft RMs. In one or more embodiments, each of the poles may include a plurality of the soft RMs. For example, the rotor (300) shown in FIGS. 3A-3B includes ten poles around a rotor core (306), and each of the poles includes eight soft RMs (302) (i.e., segments) disposed next to each other in the circumferential direction (308) and in the along the axial direction (312) between two ferrous wedges (304). In a viewing direction along the axial direction (312) (view of FIG. 3B), there are rows of soft RMs (302) disposed next to each other such that four soft RMs (302) are disposed next to each other in each of the rows.

In other embodiments, the number of the rows of soft RMs (302) may be more or less than two and the number of the soft RMs (302) in each of the rows may be more or less than four depending on a specific design and function, as well as manufacturing constraints, of the VFMM.

According to one or more embodiments, an advantage of having multiple soft RMs (302) in a pole over having a single RM is reducing eddy currents in the soft RMs (302) during the VFMM operation as well as more defined control of magnetic field orientation inside the VFMM. When the soft RMs (302) or other conductive components of the VFMM are in a time-varying magnetic flux such as an AC magnetic flux, eddy currents are induced in the soft RMs (302) and in other conductive components of the VFMM. Eddy currents in the soft RMs (302) produce heat. Using multiple soft RMs (302) helps to reduce the eddy currents because small airgaps at the interface of adjacent soft RMs (302) stop the eddy currents from conducting between the adjacent soft RMs (302). Thus, the eddy currents and resistive losses will be reduced.

According to one or more embodiments, the rotor core (306) may be entirely or partially non-conductive and/or non-magnetic. For example, the rotor core (306) may be made of polyamide-imide, G10, thermoplastic materials, three-dimensional printed materials, Delrin, etc. A non-conductive rotor core (306) could be significantly lighter than traditional rotor cores that are made of metals such as aluminum and laminated or solid magnetic steel. According to one or more embodiments, the eddy currents cannot be generated in the non-conductive rotor core (306). Thus, the non-conductive rotor core (306) remains cooler than the traditional metallic rotor cores. In addition, reducing or omitting the eddy currents in the rotor core (306) is advantages because of reducing parasitic magnetic flux generated by the eddy currents that interfere with the magnetic flux generated by the stator windings. The interference of the magnetic fluxes may reduce the efficiency and controllability of the magnetization of the VFMM.

According to one or more embodiments, the rotor (300) may be mounted on a polygon (e.g., a hexagon) shaft (314) for a better grip between the rotor (300) and the shaft (314) or in other words, a better torque transfer between the shaft (314) and the rotor (300). Those skilled in the art will appreciate that other shapes may be employed for the shaft (314) depending on the purposes of the rotor (300).

According to one or more embodiments, the soft RMs and the ferrous wedges are designed to magnetize the soft RMs more efficiently than before. When the magnetic flux outside of the soft RMs (dissipated magnetic flux) is eliminated and instead, the magnetic flux is guided toward the soft RMs via the ferrous wedges, the efficiency of the VFMM magnetization increases. To eliminate the magnetic flux dissipation, the soft RMs and the ferrous wedges are designed to create the most efficient path for the magnetic flux inside the soft RMs. Hereinafter, the average direction of the magnetic flux inside the soft RMs will be referred to as the "magnetization direction." According to one or more embodiments, the ferrous wedges may have a triangular shape to efficiently guide the magnetic flux to the soft RMs. For example, the ferrous wedges may be similar to the ferrous wedges (304) shown in FIGS. 3A-3B.

Figure 4A:
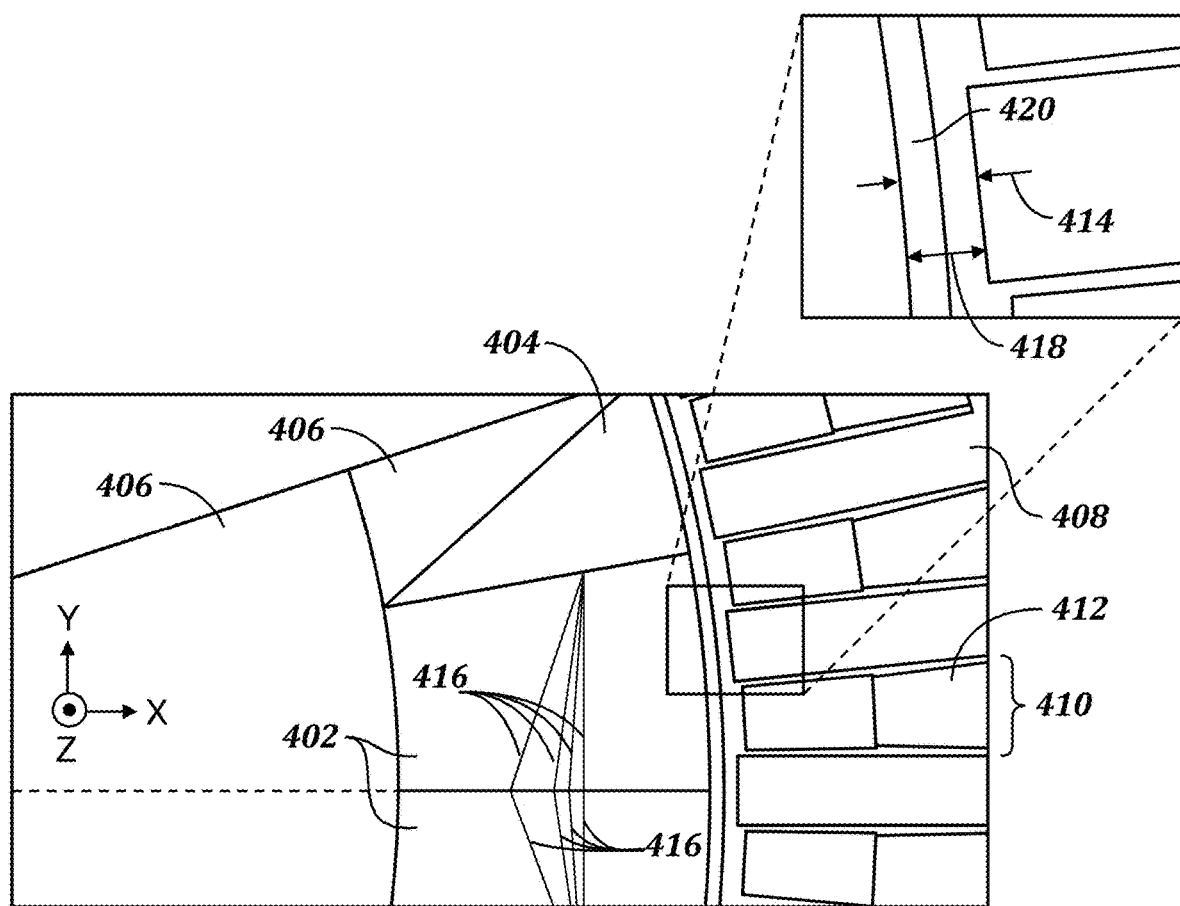
FIG. 4A shows magnetization directions in a cross-sectional view of a portion of the VFMM in accordance with one or more embodiments of the invention.

FIG. 4A shows various magnetization directions inside the soft RMs (402) in a cross-sectional view of the VFMM that includes the soft RMs (402), the ferrous wedges (404), the rotor core (406), the stator teeth (408), and the stator slots (410) that accommodate ends of the stator windings (412).

The magnetization directions in FIG. 4A are indicated by the slope of the magnetization directions in a Cartesian coordination in which "X" and "Y" axes are defined in FIG. 4A. The X axis is parallel to the interface between the soft RMs (402) and the Y axis is perpendicular to the X axis and the axial direction of the rotor. When the slope of a magnetization direction in the Cartesian coordination is "S," the magnetization direction is defined as "+X/S+Y" and "−X/S+Y" in the upper and lower soft RMs (402), respectively.

According to one or more embodiments, a current conducting in the stator windings (412) creates a magnetic flux in the airgap (414) between the rotor and the stator. The ferrous wedges (404) guide the magnetic flux in the airgap (414) to the soft RMs (402) to magnetize the soft RMs (402).

According to one or more embodiments, the efficiency of the VFMM, which is the percentage of the total output mechanical power of the VFMM over the input electrical power of the VFMM, depends on the magnetization direction. Increasing the efficiency of electric motors is highly important in industry, and improvements of the efficiency even within 1% is considered substantial in the art. The efficiency is calculated using a numerical software (Finite Element Analysis) and is verified experimentally. All known losses of the machine including electrical and mechanical losses are considered in the calculation of the efficiency. The effect of the VFMM magnetization on the efficiency is more notable in electromagnetic losses. Electromagnetic losses include resistive losses in the stator windings, resistive losses by the eddy currents, and losses that are due to dissipation of the magnetic flux by straying out of the permeable areas (e.g., ferrous wedges and RMs) (hereinafter, will be referred to as stray losses).

Table 1 below shows the efficiency for various magnetization directions in accordance with one or more embodiments.

TABLE 1

| Test case | Magnetization direction | Efficiency (%) | Average torque (n.m.) |
|---|---|---|---|
| 1 | Circumferential (not manufacturable) | 96.8 | 402.8 |
| 2 | +Y | 96.88 | 406.9 |
| 3 | +X/4+Y | 96.8 | 401.7 |
| 4 | +X/8+Y | 96.92 | 406.3 |
| 5 | +X/16+Y | 96.93 | 407.23 |
| 6 | −X/16+Y | 96.8 | 402.08 |
| 7 | +X/32+Y | 96.915 | 406.5 |

In Table 1, the magnetization direction for "test case 1" is circumferential, which means the average direction of the magnetic flux inside the soft RMs is along the circumference of the rotor. For example, with reference to FIG. 3B, the average direction of the magnetic flux inside the soft RMs (302) may be along the circumferential direction (308).

According to one or more embodiments, the geometries of the soft RMs (402), ferrous wedges (404), and the rotor core (406) are optimized to achieve the magnetization directions in Table 1.

Table 2 below shows five different designs each including exemplified geometrical factors of the soft RMs and ferrous wedges with reference to FIG. 4B that result to optimal magnetization directions to achieve the highest power efficiency at minimum mass of the VFMM. The geometrical factors in Table 2 correspond to various magnetization directions in accordance with one or more embodiments. These geometrical factors have been achieved through optimization methods to obtain the efficiencies in Table 1.

TABLE 2

| Parameters | Design 1 | Design 2 | Design 3 | Design 4 | Design 5 |
|---|---|---|---|---|---|
| Magnet Depth (cm) | 2.25 | 2.0 | 2.0 | 2.0 | 1.5 |
| Magnet Fraction (%) | 58 | 42 | 42 | 70 | 70 |
| Magnet Material | AlNiCo 9 | AlNiCo 9 | AlNiCo 5 | AlNiCo 9 | AlNiCo 9 |
| Rotor Inert Radius (cm) | 7.55 | 7.0 | 7.0 | 7.0 | 7.0 |
| Optimal Magnetization Direction | −X/16+Y | −X/8+Y | −X/8+Y | −X/8+Y | −X/5+Y |
| Torque | 396 | 320 | 256 | 370 | 303 |
| Efficiency | 94.4 | 93.1 | 87.7 | 94.5 | 93 |

Figure 4B:
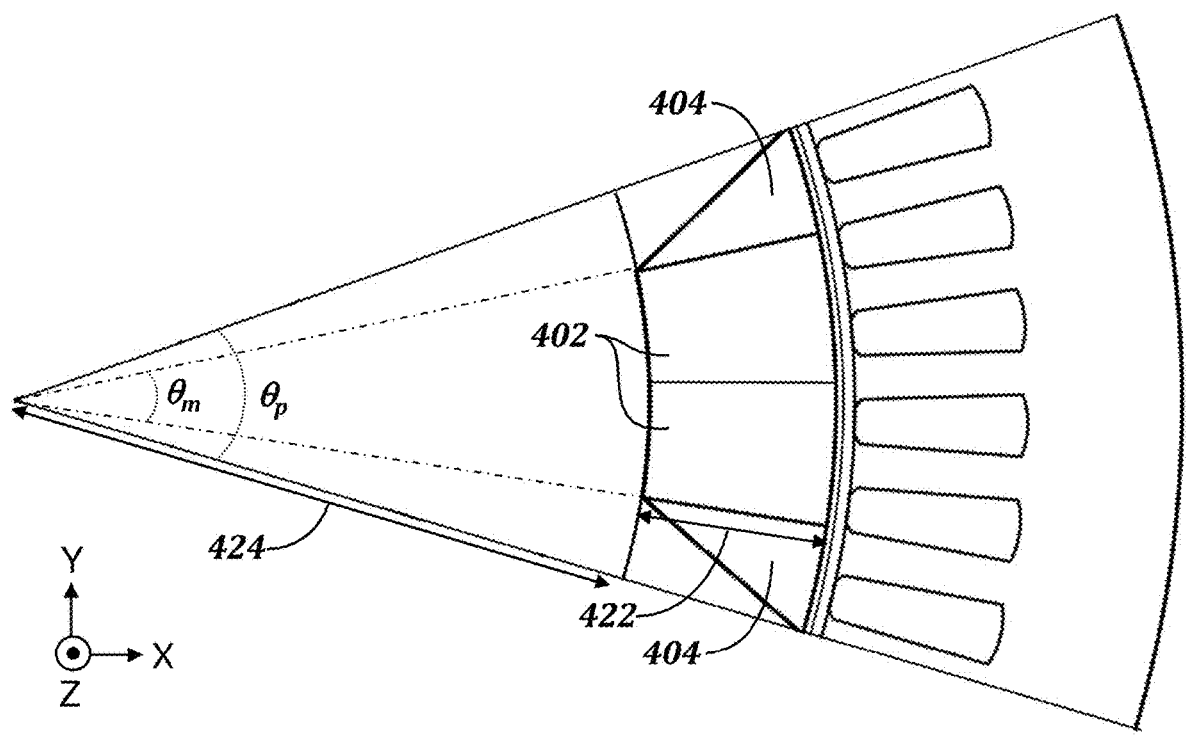
FIG. 4B shows a cross-sectional view of a portion of the VFMM in accordance with one or more embodiments of the invention.

FIG. 4B corresponds to the examples in Table 2. As shown in FIG. 4B, the magnet depth (422) in Table 2 is the radial thickness of the soft RMs (402). The magnet fraction in Table 2 is a percentage ratio between the angle ($\theta_m$) that corresponds to the soft RMs (402) for each pole and of the angle ($\theta_p$) that corresponds to the entire pole in the cross-sectional view of the rotor. For example, if the rotor includes 10 poles, $\theta_p$ will be 36 degrees=360/P, where "P" is the number of poles. In this example, the magnet fraction of 58% is equal to $100 \times \theta_m/\theta_p$. Thus, $\theta_m$ of this example will be 20.88 degrees. The rotor inert radius (424) is the radial distance between the rotor RMs (402) and the center of the rotor, as shown in FIG. 4B. As shown in FIG. 4B, in the examples of Table 2, each of the ferrous wedges (404) has the triangular-type shape.

Although the designs shown in Table 2 are examples of the rotor to achieve the corresponding magnetization directions, one of ordinary skill in the art appreciates that the embodiments of the invention are not limited to these examples and that values of the geometrical factors in Table 2 can be achieved through optimization and computational simulations to achieve a specific magnetization direction depending on a design or manufacturing constraints of the VFMM.

For example, the magnetization direction may be determined via simulations using a commercial finite element method (FEM) software. In the FEM software, the geometries of the VFMM can be defined by building a three-dimensional model of the VFMM, and the magnetization direction can be determined by computationally solving electromagnetic equations for the VFMM model in an electromagnetic module of the FEM software. The FEM software may have multiple modules such as thermal transfer module and mechanical stress module that may be coupled to the electromagnetic module of the FEM software to determine a more accurate and universal performance of the VFMM.

In one or more embodiments, the variables in Table 2 can be varied in the FEM simulations to obtain different magnetization directions. For example, magnet depth, magnet fraction, or rotor inert radius for Design 1 can be changed (i.e., adjusted) to achieve a magnetization direction different than −X/16+Y.

In one or more embodiments, the geometries of the rotor can be formulated, and optimization methods can be applied to the formulated geometries to achieve the optimal magnetization direction. For example, the edges of the rotor RMs (402) and the ferrous wedge (404) in FIG. 4C can be define via formulas (1)-(7) below.

Figure 4C:
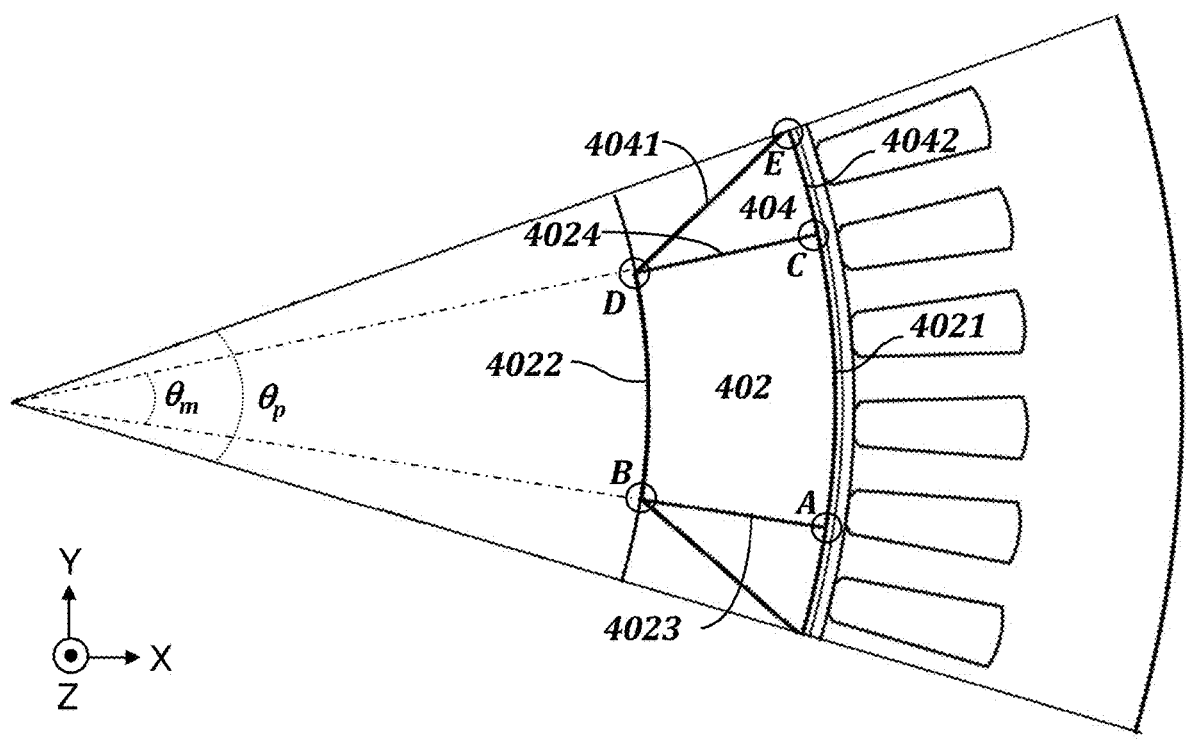
FIG. 4C shows a cross-sectional view of a portion of the VFMM in accordance with one or more embodiments of the invention.

(1) The first end of edge (4021) is at point "A" in FIG. 4C, which is at x=(ri+drb+dm)×cos(−$\alpha_m$×180 degree/P+qrr−180 degree/P) and y=(ri+drb+dm)×sin(−$\alpha_m$×180 degree/P+qrr−180 degree/P). The second end of edge (4021) is at point "C," which is at x=(ri+drb+dm)×cos ($\alpha_m$×180 degree/P+qrr−180 degree/P) and y=(ri+drb+dm)×sin($\alpha_m$×180 degree/P+qrr−180 degree/P). The curvature of edge (4021) between the first and second ends of edge (4021) is 360 degree/P.

(2) The first end of edge (4022) is at point "B," which is at x=(ri+drb)×cos(−$\alpha_m$×180 degree/P+qrr−180 degree/P) and y=(ri+drb)×sin(−$\alpha_m$×180 degree/P+qrr−180 degree/P). The second end of edge (4022) is at point "D," which is at x=(ri+drb)×cos($\alpha_m$×180 degree/P+qrr−180 degree/P) and y=(ri+drb)×sin($\alpha_m$×180 degree/P+qrr−180 degree/P). The curvature of edge (4022) between the first and second ends of edge (4022) is 360 degree/P.

(3) The edge (4023) is a straight line between points A and B.

(4) The edge (4024) is a straight line between points C and D.

(5) The ferrous wedge (404) shares the edge (4024) with the soft PMs (402).

(6) The edge (4042) of the ferrous wedge (404) is starts at points C and ends with a curve of ($\alpha_i$−$\alpha_m$)×180 degree/P at E.

(7) The edge (4041) of the ferrous wedge (404) is a straight line between point D and point E.

In the above formulas (1)-(7), "ri" is the rotor inert radius, "drb" is rotor back iron, "dm" is magnet depth (4025), "$\alpha_m$" is scaled magnet fraction. For example, for a magnet fraction of 58%, $\alpha_m$ is 0.58. "$\alpha_i$" is equal to 1−$\alpha_m$. "P" is the number of poles. "qrr" is equal to ωt+θ, where theta is "ω" is the angular velocity of the rotor and, "t" is time, and "θ" is an angle offset.

In one or more embodiments, the gap (418) between the soft RMs or the ferrous wedges and the stator (hereinafter will be referred to as "gap") that may include the airgap (414) and a non-magnetic sleeve (420) may not directly affect the magnetization direction. However, the gap (418) may affect the efficiency because more energy is required to pass the magnetic flux from the stator windings through the gap (418), which may have a magnetic permeability of about 1. In one or more embodiments, the gap (418) may be about 2.25 mm such that 0.9 mm of the gap may be occupied by sleeve (420) and 1.35 mm is the airgap (414) between the sleeve (420) and the stator.

Figure 5A:
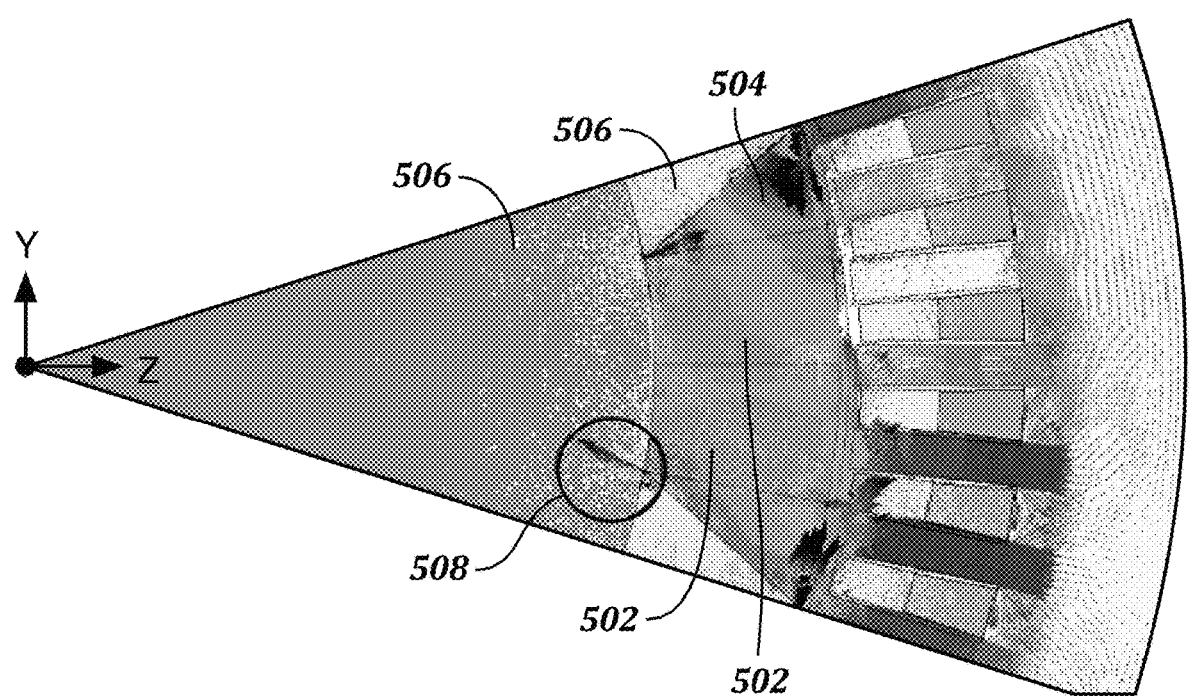
FIGS. 5A-5B show distributions of magnetic fluxes in cross-sectional views of the VFMM in accordance with one or more embodiments of the invention.
Figure 5B:
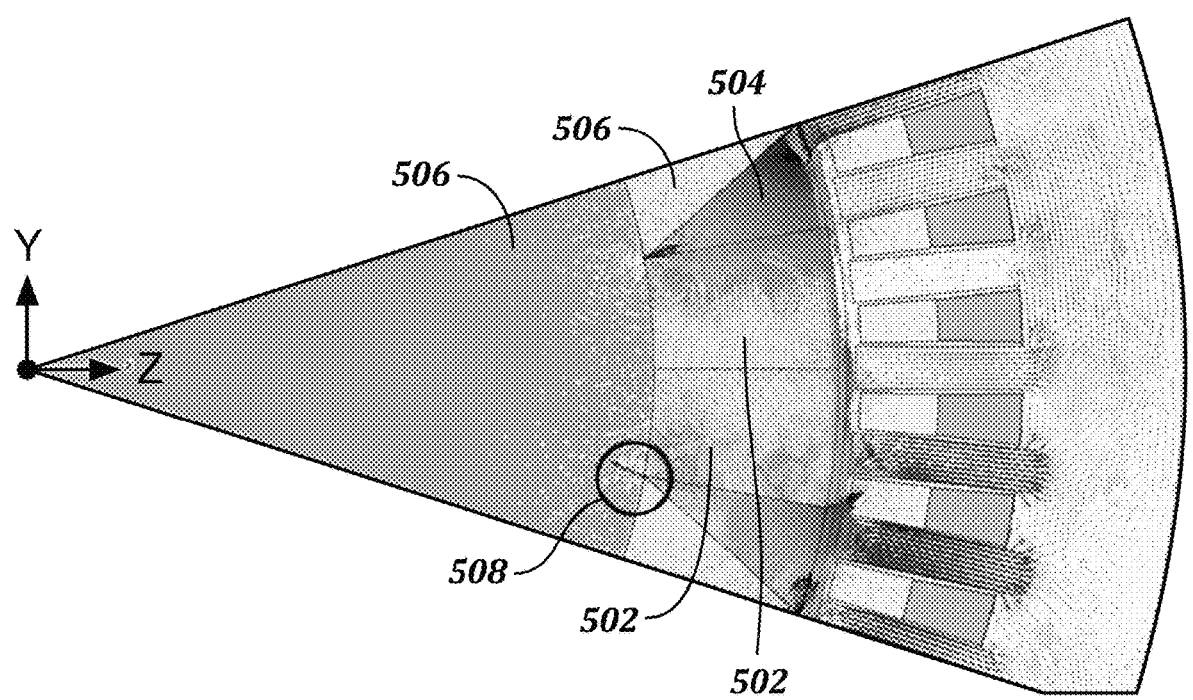

FIGS. 5A and 5B show magnetic fluxes in cross-sectional views of the VFMM for magnetization directions of ±X/4+Y and ±X/16+Y, respectively. These figures illustrate how the magnetization direction affects the VFMM efficiency. In these figures, the ferrous wedges (504) conduct the magnetic flux generated by the stator windings to the soft RMs (502). The rotor core (506) is chosen from non-conductive/non-magnetic polyamide-imide to prevent shunting the magnetic flux by the rotor core (506). Thus, most of the magnetic flux enters and magnetizes the soft RMs (502).

According to one or more embodiments, the shapes and sizes of the soft RMs (502) and the ferrous wedges (504) determine the efficiency of magnetizing the soft RMs (502) and dissipation of the magnetic flux to outside of the soft RMs (502). For example, there is less stray (508) of the magnetic flux for magnetization directions of ±X/16+Y (shown in FIG. 5B) than for the magnetization directions of ±X/4+Y (shown in FIG. 5A). Consequently, the magnetization of the soft RMs (502) is more efficient with magnetization directions of ±X/16+Y than with magnetization directions of ±X/4+Y. The stray (508) of the magnetic flux is an example of the stray losses described above.

Figure 6A:
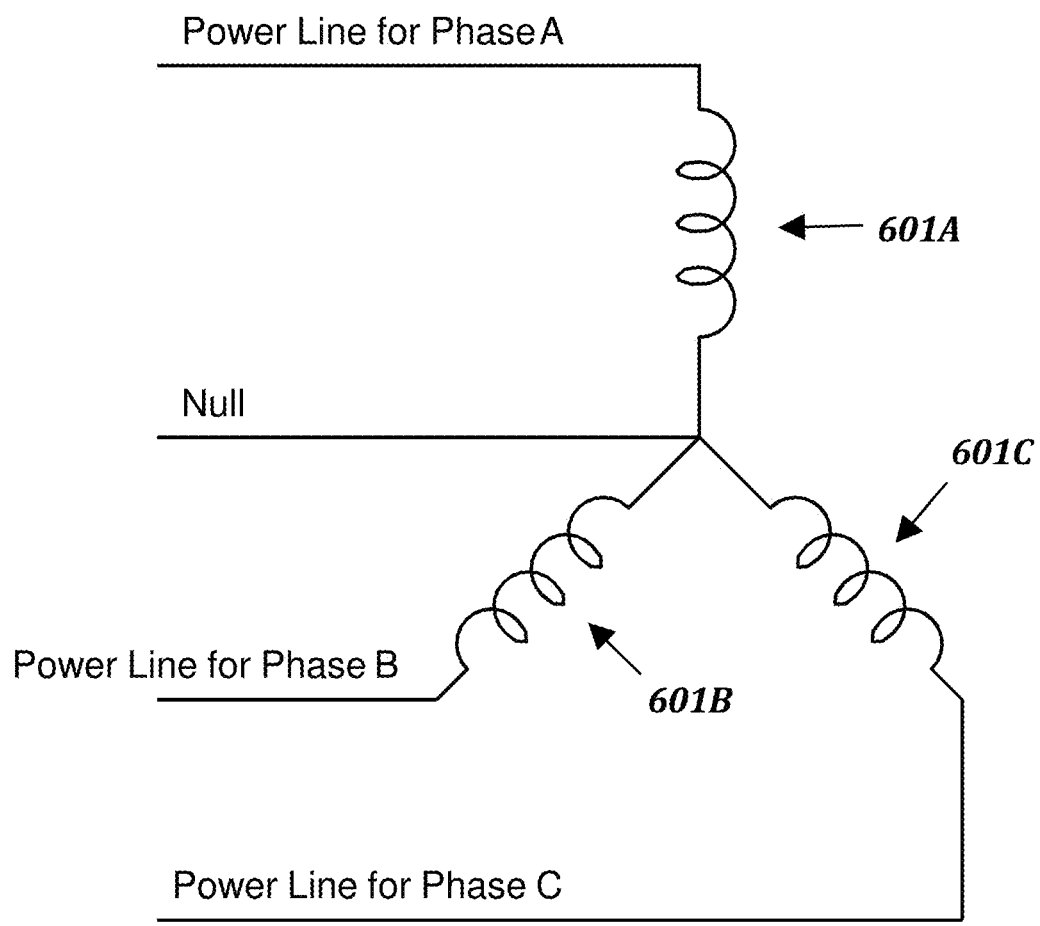
FIG. 6A shows a simplified circuit model of stator windings of the VFMM in accordance with one or more embodiments of the invention.

According to one or more embodiments, the stator windings create the magnetic flux necessary to magnetize the VFMM and rotate the rotor. FIG. 6A shows a simplified circuit model of the stator windings that are wound in a wye configuration. There are three stator windings (i.e., first stator winding (601A), second stator winding (601B), and third stator winding (601C)) that carry phases A, B, and C, which are delayed from each other by 120 degrees. For example, if phase A is zero, phase B is 120 degrees and phase C is −120 degrees. The three stator windings are connected to a null. Each of the three stator windings may include multiple winding coils that are wound in the same direction and are connected with each other.

Figure 6B:
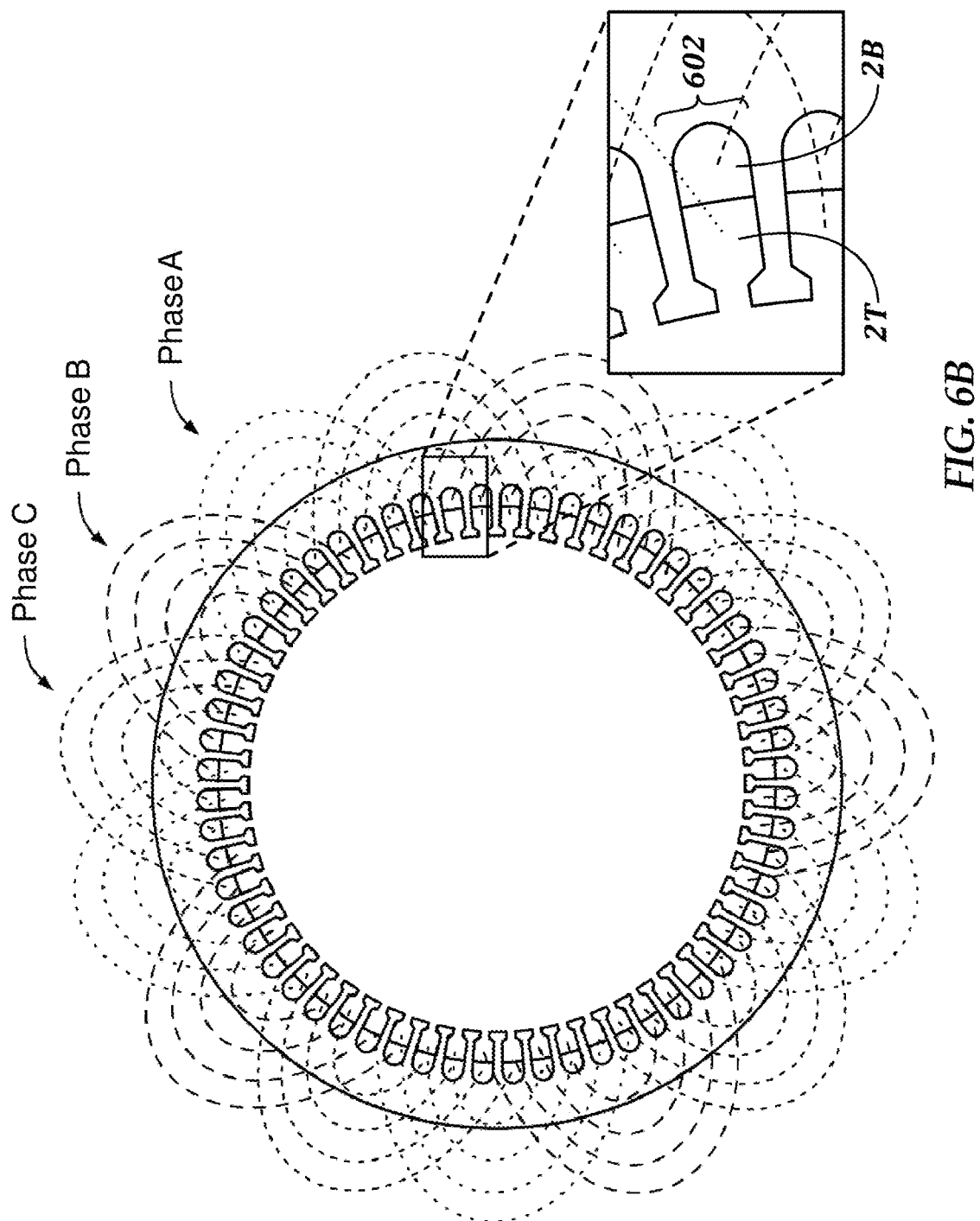
FIG. 6B shows stator windings of the VFMM in accordance with one or more embodiments of the invention.

FIG. 6B shows how the three stator windings are wound in the stator by way of an example in accordance with one or more embodiments. Each of the stator windings includes a plurality of winding coils. In the example shown in FIG. 6B, each of the stator windings for phases A, B, and C includes 20 winding coils. For each of the three phases, the winding coils carry a single phase (i.e., one of phases A, B, and C).

In the example shown in FIG. 6B, each of the stator slots (602) accommodates one end of one winding coil and one end of another winding coil. For example, stator slot 2 shown in the magnified view of FIG. 6B includes a top section (2T) that accommodates an end of a winding coil for phase A and a bottom section (2B) that accommodates an end of a winding coil for phase B.

Table 3 below shows an example of the winding coils for the stator windings in FIG. 6B.

TABLE 3

| Winding Coil Number | Phase Group | Turns | In Slot | Out Slot |
|---|---|---|---|---|
| Coil_1 | A1 | 5 | 2T Lead | 11B |
| Coil_2 | A1 | 14 | 3T | 10B |
| Coil_3 | A1 | 14 | 4T | 9B |
| Coil_4 | A1 | 5 | 5T | 8B Finish |
| Coil_5 | B1 | 5 | 6T Lead | 15B |
| Coil_6 | B1 | 14 | 7T | 14B |
| Coil_7 | B1 | 14 | 8T | 13B |
| Coil_8 | B1 | 5 | 9T | 12B Finish |
| Coil_9 | C1 | 5 | 10T Lead | 19B |
| Coil_10 | C1 | 14 | 11T | 18B |
| Coil_11 | C1 | 14 | 12T | 17B |
| Coil_12 | C1 | 5 | 13T | 16B Finish |
| Coil_13 | A2 | 5 | 14T Lead | 23B |
| Coil_14 | A2 | 14 | 15T | 22B |
| Coil_15 | A2 | 14 | 16T | 21B |
| Coil_16 | A2 | 5 | 17T | 20B Finish |
| Coil_17 | B2 | 5 | 18T Lead | 27B |
| Coil_18 | B2 | 14 | 19T | 26B |
| Coil_19 | B2 | 14 | 20T | 25B |
| Coil_20 | B2 | 5 | 21T | 24B Finish |
| Coil_21 | C2 | 5 | 22T Lead | 31B |
| Coil_22 | C2 | 14 | 23T | 30B |
| Coil_23 | C2 | 14 | 24T | 29B |
| Coil_24 | C2 | 5 | 25T | 28B Finish |
| Coil_25 | A3 | 5 | 26T Lead | 35B |
| Coil_26 | A3 | 14 | 27T | 34B |
| Coil_27 | A3 | 14 | 28T | 33B |
| Coil_28 | A3 | 5 | 29T | 32B Finish |
| Coil_29 | B3 | 5 | 30T Lead | 39B |
| Coil_30 | B3 | 14 | 31T | 38B |
| Coil_31 | B3 | 14 | 32T | 37B |
| Coil_32 | B3 | 5 | 33T | 36B Finish |
| Coil_33 | C3 | 5 | 34T Lead | 43B |
| Coil_34 | C3 | 14 | 35T | 42B |
| Coil_35 | C3 | 14 | 36T | 41B |
| Coil_36 | C3 | 5 | 37T | 40B Finish |

TABLE 3-continued

| Winding Coil Number | Phase Group | Turns | In Slot | Out Slot |
|---|---|---|---|---|
| Coil_37 | A4 | 5 | 38T Lead | 47B |
| Coil_38 | A4 | 14 | 39T | 46B |
| Coil_39 | A4 | 14 | 40T | 45B |
| Coil_40 | A4 | 5 | 41T | 44B Finish |
| Coil_41 | B4 | 5 | 42T Lead | 51B |
| Coil_42 | B4 | 14 | 43T | 50B |
| Coil_43 | B4 | 14 | 44T | 49B |
| Coil_44 | B4 | 5 | 45T | 48B Finish |
| Coil_45 | C4 | 5 | 46T Lead | 55B |
| Coil_46 | C4 | 14 | 47T | 54B |
| Coil_47 | C4 | 14 | 48T | 53B |
| Coil_48 | C4 | 5 | 49T | 52B Finish |
| Coil_49 | A5 | 5 | 50T Lead | 59B |
| Coil_50 | A5 | 14 | 51T | 58B |
| Coil_51 | A5 | 14 | 52T | 57B |
| Coil_52 | A5 | 5 | 53T | 56B Finish |
| Coil_53 | B5 | 5 | 54T Lead | 3B |
| Coil_54 | B5 | 14 | 55T | 2B |
| Coil_55 | B5 | 14 | 56T | 1B |
| Coil_56 | B5 | 5 | 57T | 60B Finish |
| Coil_57 | C5 | 5 | 58T Lead | 7B |
| Coil_58 | C5 | 14 | 59T | 6B |
| Coil_59 | C5 | 14 | 60T | 5B |
| Coil_60 | C5 | 5 | 1T | 4B Finish |

In Table 3, phase groups A1-A5 carry the same phase A, phase groups B1-B5 carry the same phase B, and phase groups C1-C5 carry the same phase C. The winding coils in each of the phase groups (e.g., phase group A1) may be connected in series with each other, and the phase groups for each phase (e.g., A) may be connected in parallel with each other. For example, the winding coils for phase group A1 are connected in series with each other, and the phase groups A1-A5 are connected in parallel with each other.

In the example shown in Table 3, coil-1 (a winding coil of phase group A1) is wound 5 turns between the top portion of slot 2 (2T) and the bottom portion of slot 11 (11B). Then, the same wire continues to wind coil-2 for the same phase group A1 between 3T and 10B for 14 turns in the same direction as coil-1. Similarly, coil-3 and coil-4 for phase group A1 are wound in the same direction and in series with coil-1 and coil-2. The lead and the finish wire-ends of phase group A1 are in slots 2T and 8B, respectively.

In Table 3, other phase groups are wound similar to phase group A1.

Figure 6C:
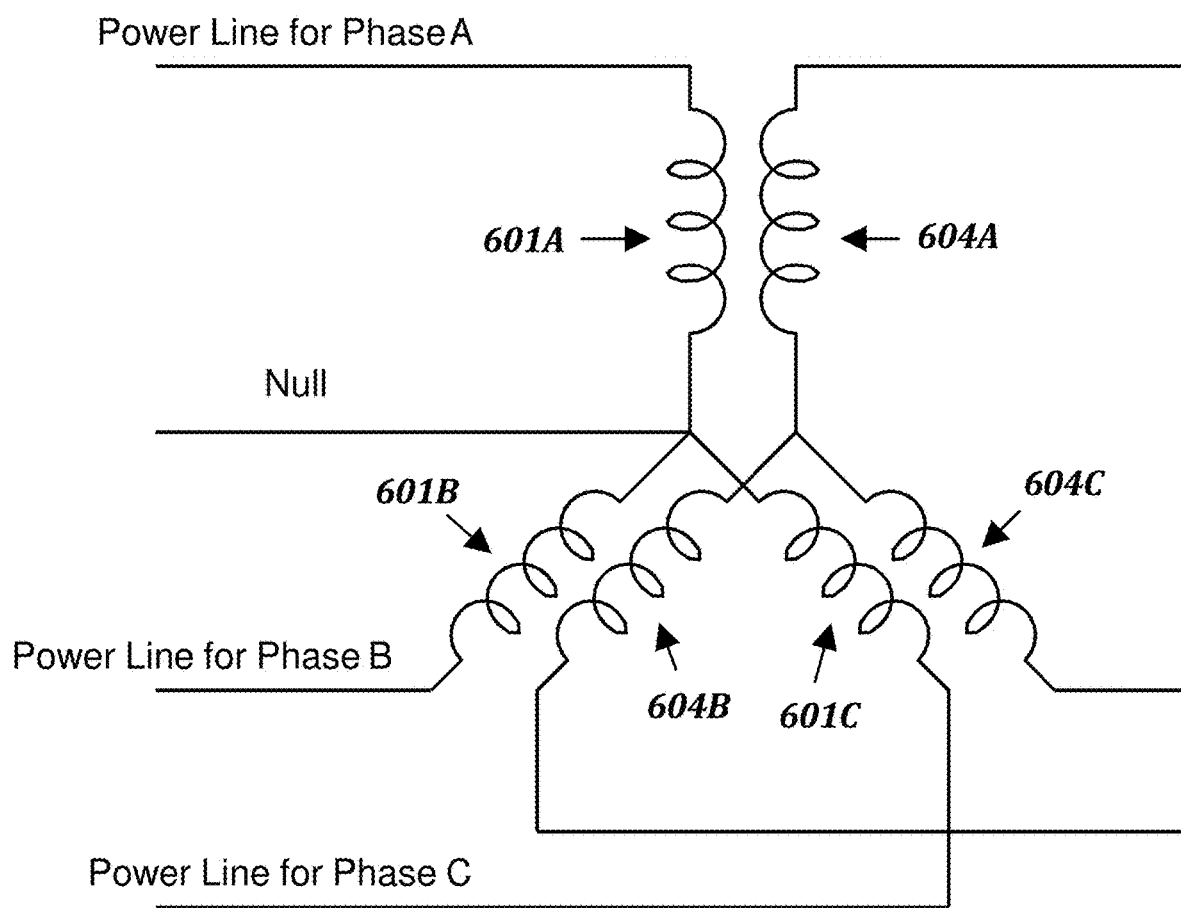
FIG. 6C shows a simplified circuit model of stator windings and sense coils of the VFMM in accordance with one or more embodiments of the invention.

According to one or more embodiments, each of phases A, B, and C may have a sense coil (in addition to the winding coils) to measure the magnetization state (MS) of the soft RMs. Thus, there may be three sense coils (i.e., first, second, and third sense coils). The sense coils can be disposed on or embedded in the stator windings, but the sense coils are electrically insulated from the stator windings. FIG. 6C shows a simplified circuit model of the first, second, and third stator windings (601A, 601B, 601C, respectively) with first, second, and third sense coils (604A, 604B, 604C, respectively) corresponding to phases A, B, and C, respectively, that are wound in the wye configuration. One of ordinary skill in the art would have appreciated that the stator windings and sense coils may be wound in a Δ (delta) configuration to achieve specific functions.

In one or more embodiments, because a high current pulse may be required for magnetizing or demagnetizing the soft RMs, the stator windings may be wound in the wye configuration because in the wye configuration, the current pulse in a power line of the VFMM for each phase is equal to the current in the stator winding for that phase. Thus, the current in the stator windings may be directly controlled and simply measured by controlling and measuring the current in the power lines. However, in the Δ configuration, the currents of the stator windings are not necessarily equal to the currents of the power lines.

In one or more embodiments, the sense coils inductively generate a back electromotive force (bemf) using the magnetic flux of the soft RMs. The strength (amplitude) of the bemf indicates the MS of the soft RMs and the rotor position. The bemf has parameters that have fixed values such as inductances and resistances. The bemf also have parameters with variable values such as angular velocity, angular position, and current. In one or more embodiments, to measure the MS of the soft RMs, these fixed and variable-value parameters must be known.

Table 4 shows an example of the winding the sense coils in accordance with one or more embodiments.

TABLE 4

| Sense Coil Number | Phase | Turns | In Slot | Out Slot |
|---|---|---|---|---|
| Coil_1 | A1 | 1 | 2T Lead | 11B |
| Coil_2 | A1 | 1 | 3T | 10B |
| Coil_3 | A1 | 1 | 4T | 9B |
| Coil_4 | A1 | 1 | 5T | 8B Finish |
| Coil_5 | B1 | 1 | 6T Lead | 15B |
| Coil_6 | B1 | 1 | 7T | 14B |
| Coil_7 | B1 | 1 | 8T | 13B |
| Coil_8 | B1 | 1 | 9T | 12B Finish |
| Coil_9 | C1 | 1 | 10T Lead | 19B |
| Coil_10 | C1 | 1 | 11T | 18B |
| Coil_11 | C1 | 1 | 12T | 17B |
| Coil_12 | C1 | 1 | 13T | 16B Finish |
| Coil_13 | A2 | 1 | 14T Lead | 23B |
| Coil_14 | A2 | 1 | 15T | 22B |
| Coil_15 | A2 | 1 | 16T | 21B |
| Coil_16 | A2 | 1 | 17T | 20B Finish |
| Coil_17 | B2 | 1 | 18T Lead | 27B |
| Coil_18 | B2 | 1 | 19T | 26B |
| Coil_19 | B2 | 1 | 20T | 25B |
| Coil_20 | B2 | 1 | 21T | 24B Finish |
| Coil_21 | C2 | 1 | 22T Lead | 31B |
| Coil_22 | C2 | 1 | 23T | 30B |
| Coil_23 | C2 | 1 | 24T | 29B |
| Coil_24 | C2 | 1 | 25T | 28B Finish |
| Coil_25 | A3 | 1 | 26T Lead | 35B |
| Coil_26 | A3 | 1 | 27T | 34B |
| Coil_27 | A3 | 1 | 28T | 33B |
| Coil_28 | A3 | 1 | 29T | 32B Finish |
| Coil_29 | B3 | 1 | 30T Lead | 39B |
| Coil_30 | B3 | 1 | 31T | 38B |
| Coil_31 | B3 | 1 | 32T | 37B |
| Coil_32 | B3 | 1 | 33T | 36B Finish |
| Coil_33 | C3 | 1 | 34T Lead | 43B |
| Coil_34 | C3 | 1 | 35T | 42B |
| Coil_35 | C3 | 1 | 36T | 41B |
| Coil_36 | C3 | 1 | 37T | 40B Finish |
| Coil_37 | A4 | 1 | 38T Lead | 47B |
| Coil_38 | A4 | 1 | 39T | 46B |
| Coil_39 | A4 | 1 | 40T | 45B |
| Coil_40 | A4 | 1 | 41T | 44B Finish |
| Coil_41 | B4 | 1 | 42T Lead | 51B |
| Coil_42 | B4 | 1 | 43T | 50B |
| Coil_43 | B4 | 1 | 44T | 49B |
| Coil_44 | B4 | 1 | 45T | 48B Finish |
| Coil_45 | C4 | 1 | 46T Lead | 55B |
| Coil_46 | C4 | 1 | 47T | 54B |
| Coil_47 | C4 | 1 | 48T | 53B |
| Coil_48 | C4 | 1 | 49T | 52B Finish |
| Coil_49 | A5 | 1 | 50T Lead | 59B |
| Coil_50 | A5 | 1 | 51T | 58B |
| Coil_51 | A5 | 1 | 52T | 57B |
| Coil_52 | A5 | 1 | 53T | 56B Finish |
| Coil_53 | B5 | 1 | 54T Lead | 3B |
| Coil_54 | B5 | 1 | 55T | 2B |
| Coil_55 | B5 | 1 | 56T | 1B |
| Coil_56 | B5 | 1 | 57T | 60B Finish |

TABLE 4-continued

| Sense Coil Number | Phase | Turns | In Slot | Out Slot |
|---|---|---|---|---|
| Coil_57 | C5 | 1 | 58T Lead | 7B |
| Coil_58 | C5 | 1 | 59T | 6B |
| Coil_59 | C5 | 1 | 60T | 5B |
| Coil_60 | C5 | 1 | 1T | 4B Finish |

The windings of the sense coils in Table 4 should be mapped similar to the winding coils in Table 3. For example, sense coils for phase group A1 may be connected in series with each other, and phase groups A1-A5 may be connected in parallel with each other.

It would have been apparent to one of ordinary skill in the art that the winding of the winding coils and sense coils may be different from Tables 3 and 4 based on a desired design to achieve specific functions.

According to one or more embodiments, the voltages between the three wires of the sense coils shown in FIG. 6C are measured and then, a conversion ratio is applied to obtain the actual voltages between the phases of the stator windings. The conversion ratio is the number of turns ratio between sense coils vs stator windings. For example, in the case the stator windings are wound in accordance with Table 3, the number of turns for the each of the stator windings is 190. If for each of the winding coils in Table 3 only one turn of the sense coil is used, the number of turns of the sense coil for each of the phases is 20. Thus, the conversion ratio in this case is 20/190 ≈0.105. In one or more embodiments, the conversion ratio for a 175 kW VFMM may be 0.0874.

In one or more embodiments, the MS of the soft RMs is determined based on equation $\lambda_m = V_s/(K \times \omega)$, where $\lambda_m$ is the flux linkage, $V_s$ is the measured voltage of the sense coils, $\omega$ is RPM and is constant in steady-state, and K is a constant related to the constructional values such as d-axis and q-axis resistances and inductances of the VFMM and the conversion ratio, which are fixed in a steady-state of the VFMM. Having constant K and $\omega$ at steady-state and $V_s$ induced in the sense coil, $\lambda_m$ can be determined. Then, the MS can be obtained from $\lambda_m$ by multiplying the $\lambda_m$ by a conversion ratio, which is a constant and depends on the design of the VFMM.

In one or more embodiments, the above equation can be expanded as follows.

$$V_q = (r_s \times I_q) + (\lambda_m \times \omega) + (\omega \times L_d \times I_d)$$

Where $V_q$ is the q-axis voltage induced on the sense coil, $L_d$ is the d-axis inductance, $I_d$ is d-axis current, $I_q$ is q-axis current, $r_s$ is the resistance of the sense coil in each of the phases and is constant. To measure $\lambda_m$, $I_d$ is considered to be zero and $I_q$ is equal to a phase current passing through a field-oriented controller controlling the VFMM. Therefore, by knowing $V_q$ measured by the sense coil and having $r_s$, $I_q$, and $\omega$ constant at steady-state, $\lambda_m$ can be determined.

According to one or more embodiments, a pulse of $I_d$ fed to the stator windings can change the VFMM magnetization, and consequently, can change the RPM of the VFMM. Because of the ability to change the MS of the soft RMs, the maximum RPM of the VFMM can be changed. Thus, the VFMM may be used without needing a transmission system to change the torque to speed ratio of the electric motor.

According to one or more embodiments, a controller controls the magnetization of the soft RMs. The controller may determine the MS of the soft RMs based on the bemf waveform (hereinafter, will be referred to as "bemf") measured by the sense coils. In one or more embodiments, the controller is capable of storing and compiling information and commanding VFMM drives (e.g., inventors, power supply, etc.) to alter the magnetization of the soft RMs according to the information. The controller may be a computer that includes a processor (e.g., a CPU) coupled to a memory (e.g., a RAM) to perform controlling of the MS.

Figure 7:
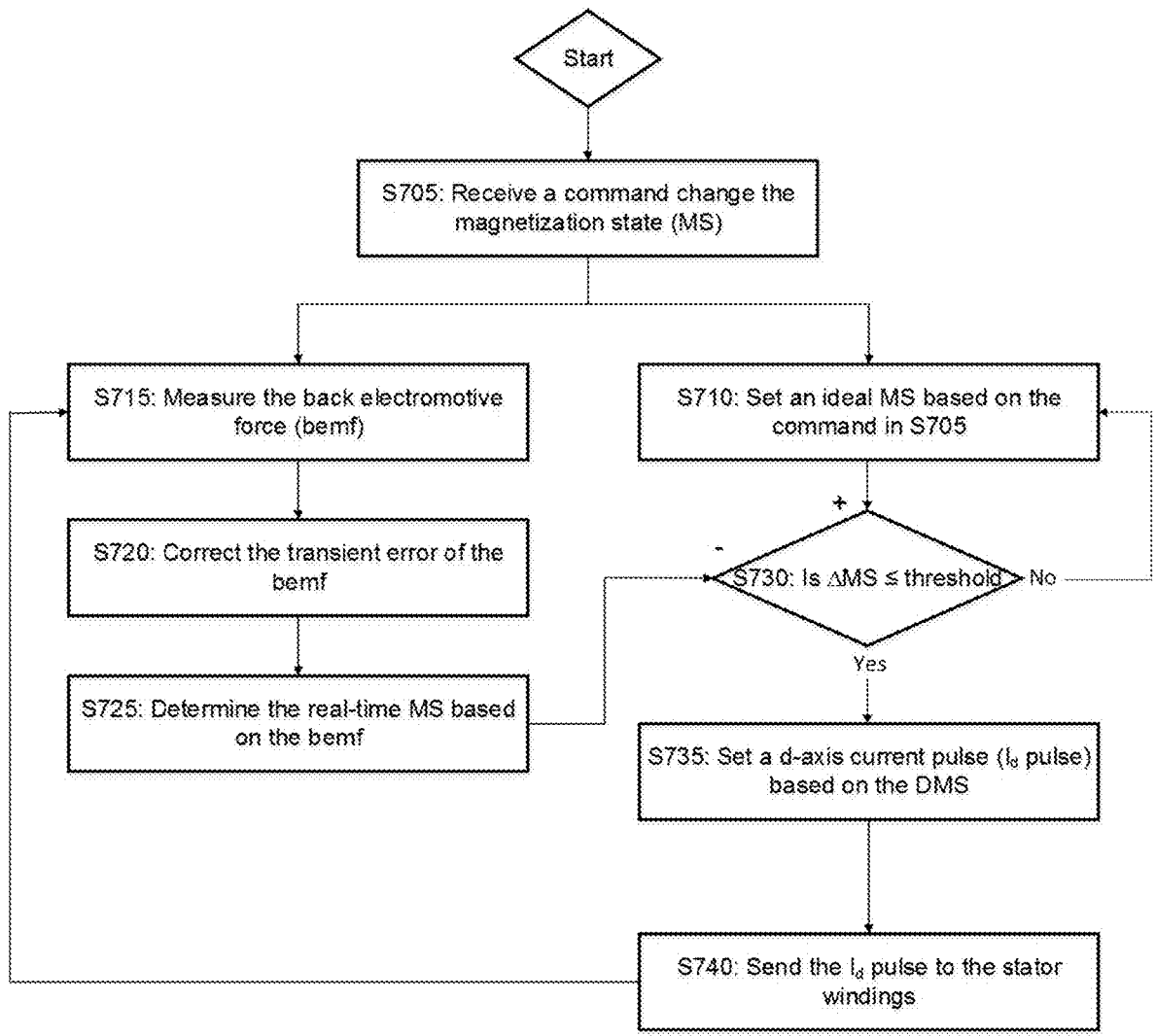
FIG. 7 shows a flowchart depicting a method for magnetization of a VFMM in accordance with one or more embodiments of the invention.

FIG. 7 shows a flowchart that depicts a method of manual controlling of the MS of the soft RMs and accordingly manually controlling the torque of the VFMM using the controller. Hereinafter, the manual control of the MS is a controlling procedure in which an initial command for changing the torque and accordingly the MS is initiated by a human. As a non-limiting example, in a case that the VFMM is a motor of an electric vehicle, the command may be a gear shift or a command to increase the speed of the electric vehicle from a driver. Alternatively, in a case that the VFMM is the motor of industrial machinery, the command may be made via an input on the control panel of the operator.

In step 705 (S705), the controller receives the command to change the MS. For example, the command may be an increase or decrease of the motor torque/RPM that requires changing the MS.

In S710, the controller determines and sets an ideal MS based on the command received in S705. For example, in a case the command is the gear shift, the ideal MS is determined based on a preliminary analysis (e.g., a table) that correlates the most optimal MS as the ideal MS to the chosen gear. For example, gear 1 may be associated with MS of 100%, while gear 2 may be associated to MS of 80%.

According to one or more embodiments, MS of 100% may be the MS of the soft RMs in which the soft RMs are magnetized to their full capacity or to a magnetization of the soft RMs that is defined (or limited to) as the maximum magnetization based on a specific design or function of the VFMM. On the other hand, MS of 0% is the MS of the soft RMs in which the soft RMs are completely demagnetized.

In another example in accordance with one or more embodiments, when the command to achieve a desired RPM/torque is received, the controller may find the ideal MS from a table that associates the desired RPM/torque to the ideal MS. Table 5 below shows an exemplary table that associates the desired RPM/torque to the ideal MS.

| RPM | Torque (N.m.) | Ideal MS (%) |
|---|---|---|
| 1000 | 100 | 100 |
| 2000 | 200 | 100 |
| 4000 | 400 | 100 |
| 6000 | 250 | 75 (±5%) |
| 6000 | 150 | 75 (±5%) |
| 12000 | 100 | 50 (±5%) |
| 18000 | 50 | 22 (±5%) |

In S715, the controller measures the bemf of the VFMM. According to one or more embodiments, the bemf is the voltages generated in the sense coils by the rotor. The bemf is proportional to $\lambda_m$ by a constant factor. Thus, the bemf indicates the real-time MS (i.e., the actual MS of the soft RMs at the time of the measurement).

In S720, the controller may correct the value of the bemf measured in S715 from transient errors. For example, due to a transient operation of the VFMM or the power converter, the measured bemf may include transient errors/noises (e.g., sparks, oscillations, etc.) that do not project the real-time MS. The controller may remove the transient errors/noises from the bemf to obtain a more realistic value of the real-time MS.

In S725, the controller determines the real-time MS based on the bemf. For example, the controller may determine the real-time MS based on a table that associates various bemf values to values of the real-time MS. In one or more embodiments, the controller determines the real-time MS based on the corrected bemf from S720. Alternatively, the controller may use the uncorrected value of the bemf to determine the real-time MS.

In one or more embodiment, the controller may determine the real-time MS from the uncorrected or corrected bemf, and then, the controller may apply some corrections (e.g., filtering noise) on the value real-time MS to obtain the final value of the real-time MS.

According to one or more embodiments, after the command from S705, the real-time MS and the ideal MS may be determined simultaneously. To do this, S715 through S725 may be performed simultaneously with S710.

In S730, the controller subtracts the ideal MS obtained from S710 from the real-time MS obtained from S725 to obtain a magnetization difference (ΔMS). If the absolute value of ΔMS≤a threshold (e.g., 5% of the ideal MS), the real-time MS is sufficiently close to the ideal MS and there is no need to change the real-time MS. Otherwise, the controller continues to S735 described below.

In S735, the controller determines and sets an $I_d$ pulse based on the ΔMS obtained from S730. For example, the controller may determine the $I_d$ pulse based on a table that associates various values of the ΔMS to values of the $I_d$ pulse.

In S740, the controller commands sending the $I_d$ pulse determined from S735 to the stator windings of the VFMM. For example, this command may be sent to the power convertor to generate and send the $I_d$ pulse to the stator windings.

According to one or more embodiments, the duration, shape, or number of the $I_d$ pulse may be determined based on the torque/RPM of the VFMM. According to one or more embodiments, the duration of the $I_d$ pulse may be about 1 millisecond (ms).

In one or more embodiments, after S740, the controller may go back to S715 and redo S715 and the steps after S715 to determine whether the ΔMS is within the threshold or not. If ΔMS is not within the threshold, the controller applies another $I_d$ pulse to adjust the real-time MS. This process may continue until the real-time MS is adjusted such that the ΔMS falls within the threshold.

Figure 8:
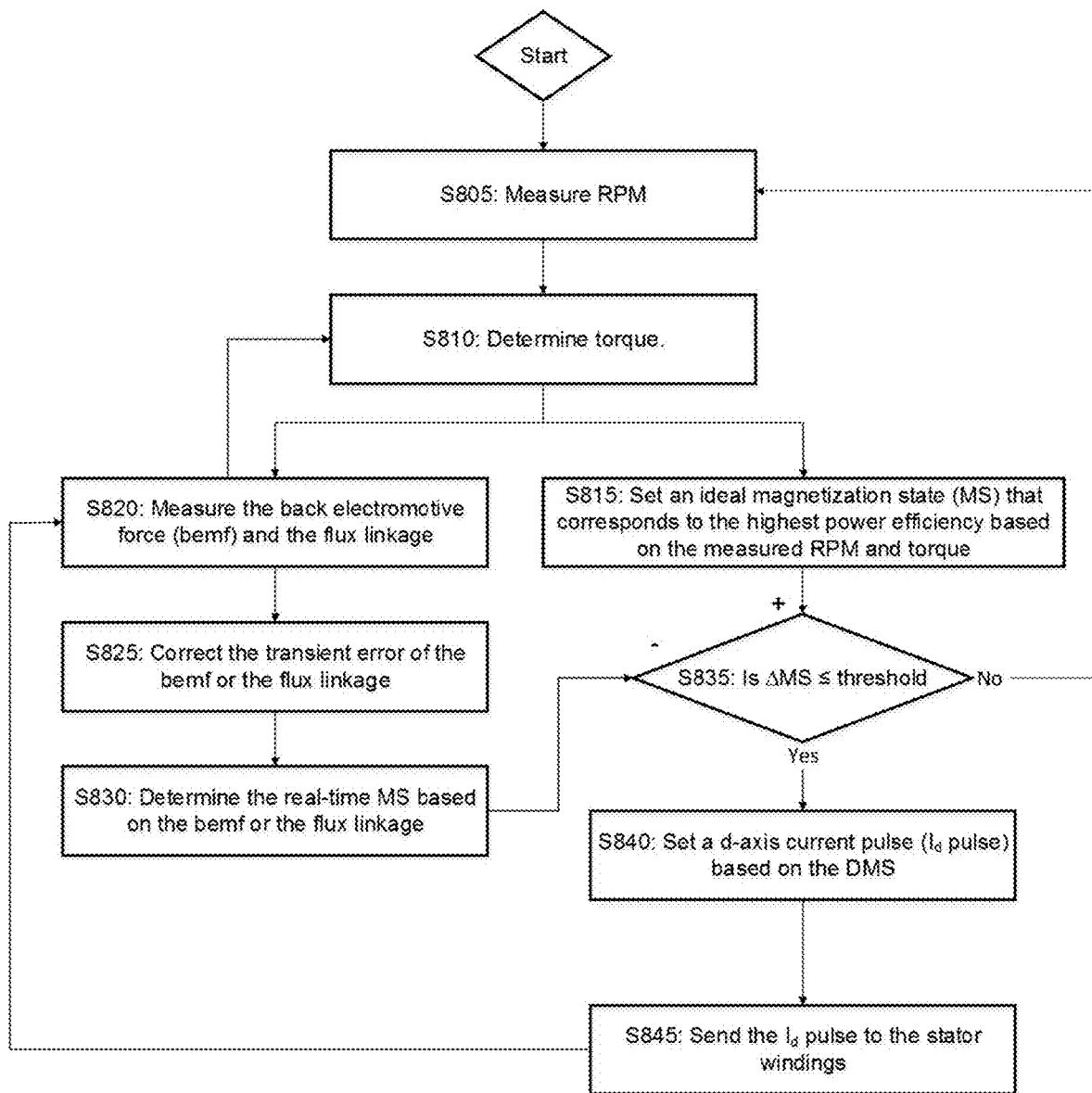
FIG. 8 shows a flowchart depicting a method for magnetization of a VFMM in accordance with one or more embodiments of the invention.

FIG. 8 shows a flowchart that depicts a method of automatic controlling of the MS of the soft RMs using the controller. Hereinafter, the automatic control of the MS is a controlling process that automatically adjusts the MS based on the RPM and torque of the VFMM to maintain the highest power efficiency of the VFMM.

In S805, the controller measures the RPM of the VFMM.

In S810, the controller determines the torque of the VFMM. According to one or more embodiments, the controller may determine the torque based on the bemf measured in S820 and/or S825, described below.

In S815, the controller determines and sets an ideal MS that corresponds to a criterion that is set for the VFMM. For example, the criterion may be the highest efficiency (e.g., power efficiency) based on the RPM and torque determined in S805 and S810, respectively, minimum magnetic signature, minimum coil temperature, etc. For example, the controller has access to a table that associates values of RPM and torque with values of the ideal MS, which results to the set criterion. From this table, the controller determines the ideal MS corresponding to the measured RPM and torque.

Figure 9:
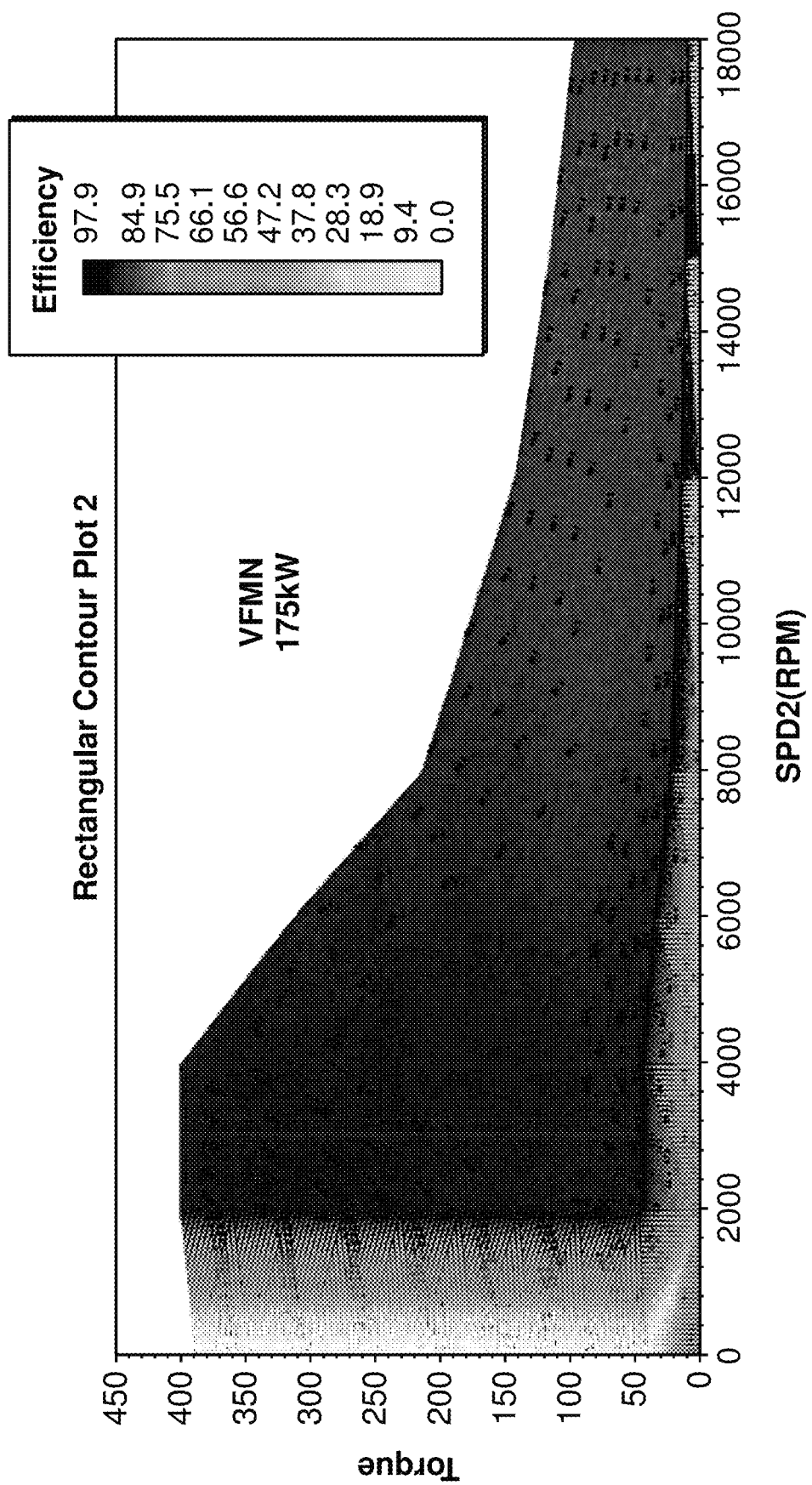
FIG. 9 shows a diagram in accordance with one or more embodiments of the invention.

FIG. 9 shows a thermal graph of the power efficiency of the VFMM with respect to the RPM and torque for the example where the set criterion is the power efficiency. In one or more embodiments, each point on the efficiency map of the VFMM shows the power efficiency and an ideal MS is associated with that point.

In S820, the controller measures the bemf of the VFMM. This is similar to S715 described above. According to one or more embodiments, the controller may also calculate the $\lambda_m$ of the VFMM based on the bemf. Then, the controller may determine the torque for S810 based on the $\lambda_m$.

For example, the torque may be calculated based on the following equation: Torque=$(3/2) \times$(number of poles/2)$\times \lambda_m \times I_q$, where $\lambda_m$ is determined based on the bemf.

In S825, the controller may correct the measured bemf in S715 from transient errors. This may be similar to S720 described above. According to one or more embodiments, the controller may calculate $\lambda_m$ based on the corrected bemf. Alternatively, the controller may calculate $\lambda_m$ based on the non-corrected bemf and then, correct $\lambda_m$ from the transient errors.

In S830, the controller determines the real-time MS based on the corrected bemf. This may be similar to S725 described above. According to one or more embodiments, the controller may determine the real-time MS based on the $\lambda_m$. For example, the controller may look up the real-time MS on a table that associates various $\lambda_m$ values to values of the real-time MS.

S835 is similar to S730. Further, according to one or more embodiments, if the absolute value of ΔMS≤a threshold, the real-time MS is ideal and there is no need to change the real-time MS. In this case the controller may go back to S805. Otherwise, the controller continues to S840.

S840 is similar to S735 described above.

S845 is similar to S740 described above.

In one or more embodiments, after S845, the controller may go back to S820 and redo S820 and steps after S820 to determine whether the ΔMS is within the threshold or not. If ΔMS is not within the threshold, the controller applies another $I_d$ pulse to adjust the real-time MS. This process may continue to adjust the real-time MS such that ΔMS falls within the threshold.

In one or more embodiments, the steps in each of the manual and automatic control of the MS described with reference to FIGS. 7-8 may be performed in a different order than what is described above, unless it is stated otherwise. The steps may be omitted or may be performed multiple times to achieve a desired control of the MS.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A multi-pole rotor of a variable-flux memory motor (VFMM), the rotor comprising:
    a rotor core; and
    a plurality of poles, wherein each of the poles comprises:
        one or more soft rotor magnets;
        a first ferrous wedge; and
        a second ferrous wedge, wherein the one or more soft rotor magnets are disposed between the first and second ferrous wedges in a circumferential direction of the rotor, and the one or more soft rotor magnets comprise a combination of aluminum, nickel, and cobalt.

2. The multi-pole rotor according to claim 1, wherein the one or more soft rotor magnets are AlNiCo with one of the grades 1-9.

3. The multi-pole rotor according to claim 1, wherein the rotor core is non-conductive.

4. The multi-pole rotor according to claim 3, wherein the rotor core is a polyamide-imide.

5. The multi-pole rotor according to claim 1, further comprising a sleeve that keeps the one or more soft rotor magnets and the first and second ferrous wedges from disassociation from the rotor core.

6. A variable-flux memory motor (VFMM) comprising:
the multi-pole rotor according to claim 1; and
a stator comprising:
a first, second, and third stator windings corresponding to a first, second and third magnetization phases, respectively, wherein
the first, second, and third stator windings create a magnetic flux to magnetize the one or more soft rotor magnets, and
during the magnetization, the magnetic flux enters the one or more soft rotor magnets from the first and second ferrous wedges.

7. The VFMM according to claim 6, wherein
the stator further comprises:
a first sense coil disposed on or in the first stator winding;
a second sense coil disposed on or in the second stator winding; and
a third sense coil disposed on or in the third stator winding, wherein
the first, second, and third sense coils are electrically insulated from the first, second, and third stator windings,
the first, second, and third sense coils inductively generate a back electromotive force via the inductance of a magnetic flux generated by the first, second, and third stator windings, respectively, and the one or more soft rotor magnets, and
the back electromotive force is an indicator of a magnetization state of the one or more soft rotor magnets.

8. A multi-pole rotor of a variable-flux memory motor (VFMM), the rotor comprising:
a rotor core; and
a plurality of poles, wherein each of the poles comprises:
one or more soft rotor magnets;
a first ferrous wedge; and
a second ferrous wedge, wherein
the one or more soft rotor magnets are disposed between the first and second ferrous wedges in a circumferential direction of the rotor, and
an absolute value of a slope of a magnetization direction in the one or more soft rotor magnets is equal to or more than 4.

9. A method of controlling a magnetization state of a variable-flux memory motor (VFMM) having a rotor, the method comprising:
receiving a command to change the magnetization state;
determining an ideal magnetization state based on the command;
measuring a back electromotive force generated by magnets of the rotor;
determining a real-time magnetization state of the magnets based on the measured back electromotive force;
determining a d-axis current pulse based on a difference between the ideal magnetization state and the real-time magnetization state; and
sending the d-axis current pulse to stator windings of the VFMM to adjust the real-time magnetization state to an adjusted real-time magnetization state such that an absolute value of the difference between the ideal magnetization state and the adjusted real-time magnetization state falls within a predetermined threshold.

10. The method according to claim 9, wherein the ideal magnetization state is determined based on a database that associates a torque and speed of the VFMM with a value of the ideal magnetization state.

11. The method according to claim 9, wherein the real-time magnetization state is determined based on a database that associates the measured back electromotive force with a value of the real-time magnetization state.

12. The method according to claim 9, wherein the back electromotive force is measured inductively via a sense coil.

13. The method according to claim 9, further comprising:
correcting a transient error of the measured back electromotive force,
wherein the real-time magnetization state of the magnets is determined based on the corrected back electromotive force.

14. The method of claim 9 that controls the VFMM comprising a multi-pole rotor, wherein the rotor comprises:
a rotor core; and
a plurality of poles, wherein each of the poles comprises:
one or more soft rotor magnets;
a first ferrous wedge; and
a second ferrous wedge, wherein
the one or more soft rotor magnets are disposed between the first and second ferrous wedges in a circumferential direction of the rotor.

15. The method of claim 9 that controls the VFMM comprising:
a multi-pole rotor comprising:
a rotor core; and
a plurality of poles, wherein each of the poles comprises:
one or more soft rotor magnets;
a first ferrous wedge; and
a second ferrous wedge, wherein
the one or more soft rotor magnets are disposed between the first and second ferrous wedges in a circumferential direction of the rotor; and
a stator comprising:
a first, second, and third stator windings corresponding to a first, second and third magnetization phases, respectively, wherein
the first, second, and third stator windings create a magnetic flux to magnetize the one or more soft rotor magnets, and
during the magnetization, the magnetic flux enters the one or more soft rotor magnets from the first and second ferrous wedges.

16. A method of automatically controlling a magnetization state of a variable-flux memory motor (VFMM) having a rotor, the method comprising:
measuring a speed of the VFMM;
determine a torque of the VFMM;
determining an ideal magnetization state based on the speed and the torque of the VFMM;

measuring a back electromotive force generated by magnets of the rotor;

determining a real-time magnetization state of the magnets based on the measured back electromotive force;

determining a d-axis current pulse based on a difference between the ideal magnetization state and the real-time magnetization state; and sending the d-axis current pulse to stator windings of the VFMM to adjust the real-time magnetization state to an adjusted real-time magnetization state such that an absolute value of the difference between the ideal magnetization state and the adjusted real-time magnetization state falls within a predetermined threshold.

17. The method according to claim 16, wherein the controller determines the torque based the back electromotive force.

18. The method according to claim 16, wherein the ideal magnetization state is determined based on a database that associates the speed and the torque of the VFMM to a value of the ideal magnetization state that results to the highest efficiency at the speed and the torque of the VFMM.

19. The method according to claim 16, wherein the real-time magnetization state is determined based on a database that associates the measured back electromotive force with a value for the real-time magnetization state.

20. The method according to claim 16, wherein the back electromotive force is measured inductively via a sense coil.

21. The method according to claim 16, further comprising:

correcting a transient error of the measured back electromotive force, wherein the real-time magnetization state of the magnets is determined based on the corrected back electromotive force.

22. The method of claim 16 that controls the VFMM comprising a multi-pole rotor, wherein the rotor comprises:

a rotor core; and a plurality of poles, wherein each of the poles comprises:
one or more soft rotor magnets;
a first ferrous wedge; and
a second ferrous wedge, wherein
the one or more soft rotor magnets are disposed between the first and second ferrous wedges in a circumferential direction of the rotor.

23. The method of claim 16 that controls the VFMM comprising:

a multi-pole rotor comprising:

a rotor core; and a plurality of poles, wherein each of the poles comprises:
one or more soft rotor magnets;
a first ferrous wedge; and
a second ferrous wedge, wherein
the one or more soft rotor magnets are disposed between the first and second ferrous wedges in a circumferential direction of the rotor; and a stator comprising:

a first, second, and third stator windings corresponding to a first, second and third magnetization phases, respectively, wherein the first, second, and third stator windings create a magnetic flux to magnetize the one or more soft rotor magnets, and during the magnetization, the magnetic flux enters the one or more soft rotor magnets from the first and second ferrous wedges.

24. A system for variable-flux memory motor (VFMM) comprising:

a VFMM comprising:

a rotor comprising a rotor core and a plurality of poles, wherein each pole comprises:
one or more soft rotor magnets;
a first ferrous wedge; and
a second ferrous wedge, wherein
the one or more soft rotor magnets are disposed between the first and second ferrous wedges, and a stator comprising:

first, second, and third stator windings corresponding to first, second, and third magnetization phases, respectively; and at least one sense coil,
wherein the sense coil measures a magnetization state of the VFMM, and a controller that controls the magnetization state of the VFMM based on the magnetization state of the VFMM measured via the sense coil, and wherein the controller adjusts the magnetization state of the VFMM via a current pulse in at least one of the first, second, and third stator windings.

* * * * *